(12) United States Patent
Nishio

(10) Patent No.: US 8,351,936 B2
(45) Date of Patent: *Jan. 8, 2013

(54) BASE STATION AND RADIO COMMUNICATION METHOD BY A BASE STATION

(75) Inventor: Akihiko Nishio, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/116,741

(22) Filed: May 26, 2011

(65) Prior Publication Data

US 2011/0230237 A1 Sep. 22, 2011

Related U.S. Application Data

(63) Continuation of application No. 12/847,791, filed on Jul. 30, 2010, now Pat. No. 7,974,623, which is a continuation of application No. 11/632,208, filed as application No. PCT/JP2005/012855 on Jul. 12, 2005, now Pat. No. 7,809,371.

(30) Foreign Application Priority Data

Jul. 14, 2004 (JP) .................................. 2004-207196
Jul. 8, 2005 (JP) .................................. 2005-200276

(51) Int. Cl.
*H04Q 7/20* (2006.01)
(52) U.S. Cl. ........ 455/434; 455/510; 455/515; 455/561; 370/437
(58) Field of Classification Search ............... 455/69, 455/434, 515, 517, 435.3, 70, 453, 510, 166.2, 455/68, 561, 17; 370/335, 328, 332, 348, 370/329, 341, 468, 441, 431, 344, 343, 437; 375/260

See application file for complete search history.

(56) References Cited

U.S. PATENT DOCUMENTS 5,581,547 A 12/1996 Umeda
5,778,316 A 7/1998 Persson et al.
(Continued)

FOREIGN PATENT DOCUMENTS

JP 2688686 8/1997
(Continued)

OTHER PUBLICATIONS

PCT International Search Report dated Nov. 1, 2005.
(Continued)

*Primary Examiner* — Sujatha Sharma
(74) *Attorney, Agent, or Firm* — Dickinson Wright PLLC

(57) ABSTRACT

A communication terminal apparatus that exhibits a shorter time period required until a start of communication and causes the throughput in the wireless communication system to be less reduced. In this apparatus, when the number, N, of retransmissions notified by a response determining part (107) is zero, a subchannel-to-be-used selecting part (108) selects a subchannel, among others, which exhibits the highest order one of the reception qualities of the subchannels notified by a reception quality determining part (106), and then notifies the selected subchannel to a subchannel allocating part (113). When the notified number, N, of retransmissions is one or more, the response determining part (107) selects a subchannel which exhibits the N-th lower order reception quality than the highest order reception quality, based on the reception qualities of the subchannels notified by the reception quality determining part (106) for a pilot signal received after a transmission of the latest access request signal, and then notifies the selected subchannel to the subchannel allocating part (113).

4 Claims, 16 Drawing Sheets

U.S. PATENT DOCUMENTS

| | | |
|---|---|---|
| 6,078,572 A | 6/2000 | Tanno |
| 6,721,569 B1 | 4/2004 | Hashem |
| 7,450,599 B2 | 11/2008 | Walls |
| 2003/0114113 A1 | 6/2003 | Kornprobst |
| 2004/0176097 A1 | 9/2004 | Wilson |
| 2004/0264497 A1 | 12/2004 | Wang |
| 2005/0105589 A1 | 5/2005 | Sung |
| 2005/0113041 A1 | 5/2005 | Polley |
| 2007/0025459 A1 | 2/2007 | Kaminski |
| 2007/0064665 A1 | 3/2007 | Zhang |
| 2008/0279257 A1 | 11/2008 | Vujcic |
| 2009/0190546 A1 | 7/2009 | Makino |

FOREIGN PATENT DOCUMENTS

| | | |
|---|---|---|
| JP | 9233051 | 9/1997 |
| JP | 2000-115834 | 4/2000 |
| JP | 2000-308148 | 11/2000 |
| JP | 2003-348047 | 12/2003 |
| JP | 2004-104574 | 4/2004 |
| JP | 2004104293 | 4/2004 |
| WO | 98/18280 | 4/1998 |
| WO | 02/069525 | 9/2002 |

OTHER PUBLICATIONS

Supplementary European Search Report dated Feb. 16, 2012.
Indian Office Action dated Jun. 26, 2012.

BASE STATION AND RADIO COMMUNICATION METHOD BY A BASE STATION

This is a continuation application of application Ser. No. 12/847,791 filed Jul. 30, 2010, which is a continuation application of application Ser. No. 11/632,208 filed Jan. 11, 2007, which is a national stage of PCT/JP2005/012855 filed Jul. 12, 2005, which is based on Japanese Application No. 2004-207196 filed Jul. 14, 2004, and Japanese Application No. 2005-200276 filed Jul. 8, 2005, the entire contents of each which are incorporated by reference herein.

TECHNICAL FIELD

The present invention relates to a communication terminal apparatus that performs radio communication with a base station apparatus and the like, and a radio transmission method.

BACKGROUND ART

Conventionally, in a radio communication system, when a communication terminal apparatus such as a mobile telephone starts radio communication such as packet transmission, the communication terminal apparatus receives a pilot signal periodically transmitted from the base station apparatus, performs open-loop transmission power control (OL-TPC) on an access request signal based on reception quality of the pilot signal, and transmits the access request signal to the base station apparatus using a random access channel (RACH), and when receiving the access request signal, the base station apparatus transmits an access permission signal to the communication terminal apparatus using a forward access channel (FACH). Then, after receiving the access permission signal, the communication terminal apparatus transmits transmission data to the base station apparatus using an uplink data channel.

In such a radio communication system, when a plurality of communication terminal apparatuses transmit access request signals concurrently using the same resource on the RACH, collision of access request signals occurs on the propagation path, and therefore the base station apparatus cannot receive the access request signals, and as a result, does not transmit access permission signals to the communication terminal apparatuses.

Therefore, a technique is developed that, when an access permission signal is not transmitted within a predetermined response waiting period after transmitting the access request signal, the communication terminal apparatus retransmits the access request signal after a lapse of back-off time randomly set using a timing at which the access request signal was previously transmitted as a reference (for example, see Patent Document 1).

FIG. 1 schematically shows the technique as described in Patent Document 1. In FIG. 1, communication terminal apparatuses 1 and 2 first transmit access request signals concurrently on the same sub-channel of the RACH, and therefore, the base station apparatus cannot receive either of the access request signals. Then, an access permission signal is not transmitted from the base station apparatus within a predetermined response waiting period after the first access request signal is transmitted, and therefore both of communication terminal apparatuses 1 and 2 retransmit access request signals to the base station apparatus after a lapse of randomly set back-off time 1 or back-off time 2, respectively.

Thus, in the technique as described in Patent Document 1, when collision of access request signals occurs, by randomly setting the back-off times, the probability of occurrence of collision of retransmitted access request signals is reduced.

Patent Document 1: Japanese Patent Application Laid-Open No. 2000-308148

DISCLOSURE OF INVENTION

Problems to be Solved by the Invention

However, in the technique as described in Patent Document 1, the time until retransmission of the access request signal is naturally longer than the response waiting period, and therefore, when collision of access request signals occurs, there is a problem that the time required for the communication terminal apparatus to start communication becomes long. Further, in the technique as described in Patent Document 1, in the radio communication system having such communication terminal apparatuses as components, the time required to start communication becomes long, and thereby a problem arises that the throughput tends to decrease.

It is therefore an object of the present invention to provide a communication terminal apparatus and radio communication method for reducing the time required to start communication and suppressing reduction in throughput in a radio communication system.

Means for Solving the Problem

A communication terminal apparatus according to the present invention adopts a configuration provided with: a sub-channel selector that selects a sub-channel to be used in transmission of a random access signal from a group of sub-channels defined by a class of frequency and selects the sub-channel different from previously used sub-channel whenever retransmitting the random access signal; and a transmitter that transmits the random access signal using the selected sub-channel.

Advantageous Effect of the Invention

According to the communication terminal apparatus according to the present invention, an access request signal is transmitted or retransmitted using a sub-channel selected from a group of sub-channels defined by a class of frequency, so that it is possible to reduce the probability of occurrence of collision of access request signals. As a result, according to the communication terminal apparatus according to the present invention, the number of retransmissions of the access request signal can be reduced, so that it is possible to start communication in a short time, and suppress reduction in throughput in the radio communication system. Further, according to the communication terminal apparatus according to the present invention, it is possible to improve the communication quality of packet communication having exacting delay requirement, such as speech communication and video transmission.

Moreover, according to the communication terminal apparatus according to the present invention, the scheme of selecting a sub-channel can be changed in the case of first transmitting an access request signal and in the case of retransmitting the access request signal after collision of access request signals occurs so that it is possible to further reduce the probability of occurrence of collision of access request signals in the case of retransmitting the access request signal.

Further, according to the communication terminal apparatus according to the present invention, when an access request signal is transmitted using a sub-channel with good reception quality of a pilot signal, it is possible to suppress the transmission power of the access request signal. As a result, in the communication terminal apparatus according to the present invention, power consumption can be suppressed, so that it is possible to extend the communication time when the battery is used. Furthermore, according to the communication terminal apparatus according to the present invention, when the communication terminal apparatus is, for example, a mobile telephone located near the cell edge, it is possible to prevent an access request signal transmitted from the communication terminal apparatus from being an interfering signal in adjacent other cells and reducing throughput in the other cells.

BEST MODE FOR CARRYING OUT THE INVENTION

Figure 1:
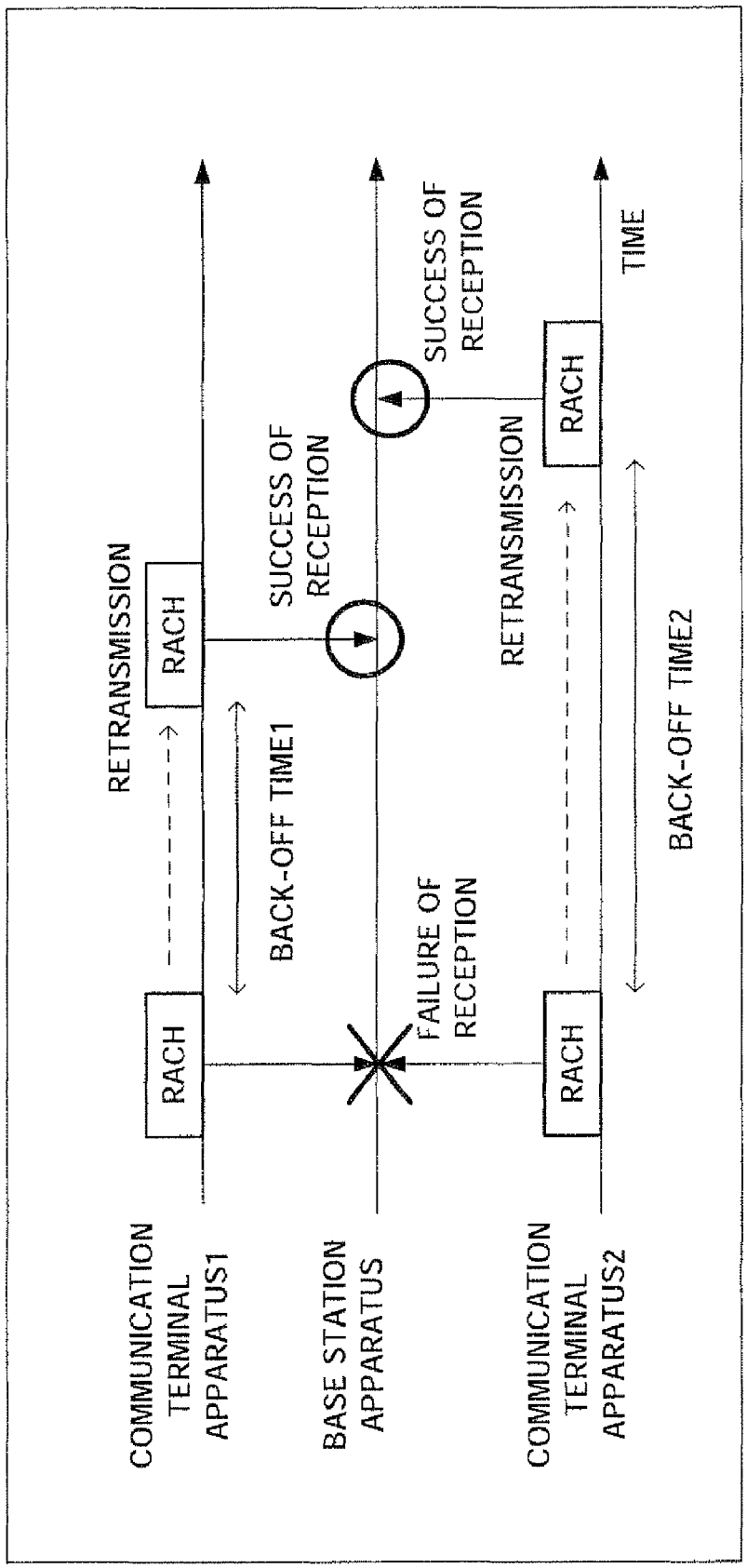
FIG. 1 schematically shows the operation of a conventional communication terminal apparatus upon start of communication.

Embodiments of the present invention will be described in detail below with reference to accompanying drawings as appropriate. Each of following Embodiments describes the case, as an example, where a plurality of communication terminal apparatuses transmit OFDM (Orthogonal Frequency Division Multiplexing) signals to a base station apparatus in a radio communication system of a cellular scheme. In addition, in the Embodiments, components with the same function are assigned the same reference numerals without further explanations.

Embodiment 1

Figure 2:
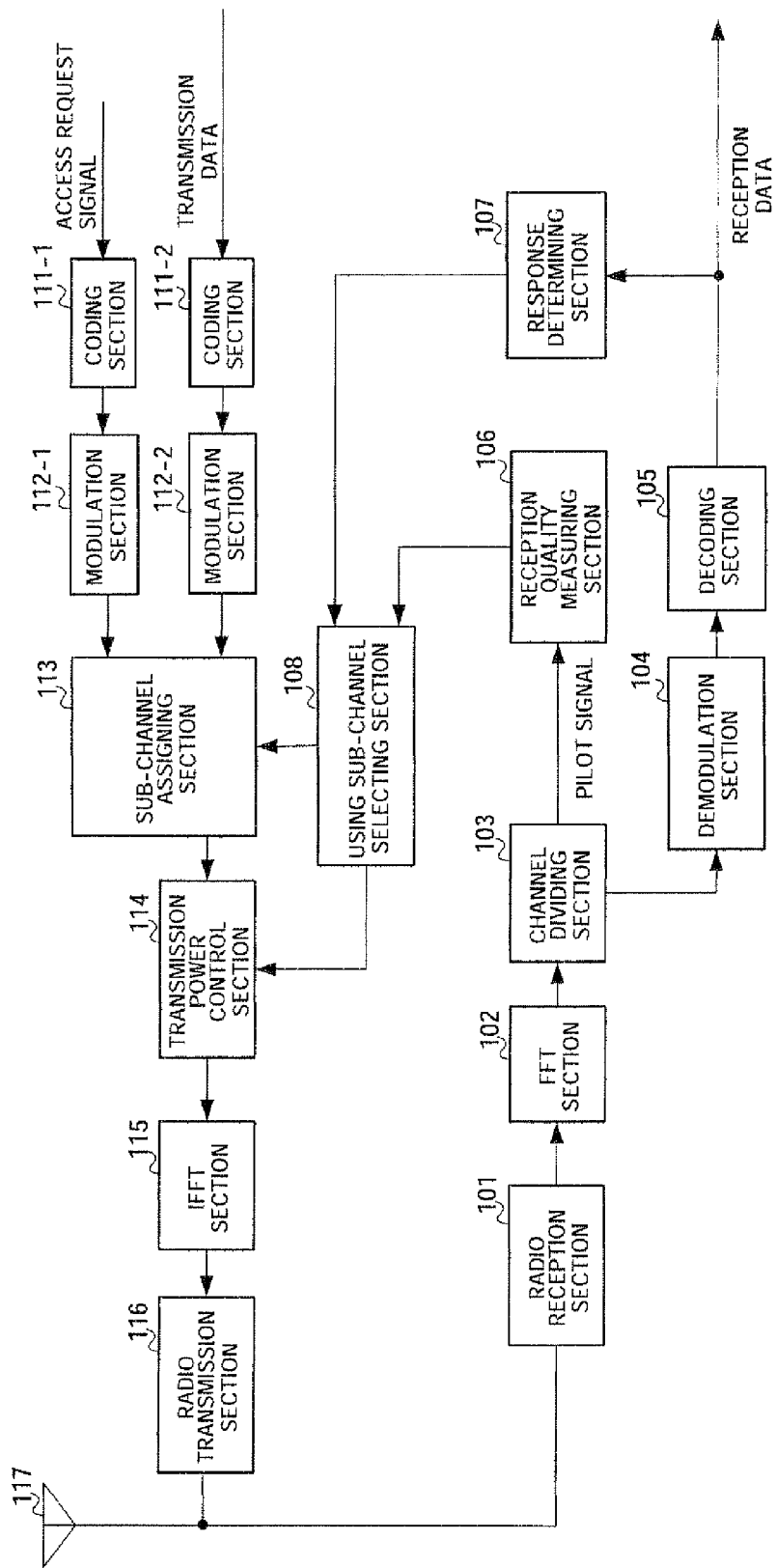
FIG. 2 is a block diagram illustrating a configuration of a communication terminal apparatus according to Embodiment 1 of the present invention.

Embodiment 1 of the present invention describes the case where an OFDM signal is transmitted or received in a time division duplex (TDD) scheme, as an example. FIG. 2 is a block diagram illustrating a configuration of communication terminal apparatus 100 according to Embodiment 1 of the present invention. Communication terminal apparatus 100 has radio reception section 101, FFT (Fast Fourier Transform) section 102, channel dividing section 103, demodulation section 104, decoding section 105, reception quality measuring section 106, response determining section 107, using sub-channel selecting section 108, coding sections 111-1 and 111-2, modulation sections 112-1 and 112-2, sub-channel assigning section 113, transmission power control section 114, IFFT (Inverse Fast Fourier Transform) section 115, radio transmission section 116 and antenna element 117.

Radio reception section 101 receives a pilot signal, access permission signal and the like transmitted by radio from a base station apparatus via antenna element 117, performs predetermined reception processing such as frequency conversion and analog/digital conversion on the received signal, and inputs the received signal subjected to the reception processing to FFT section 102.

FFT section 102 converts the received signal inputted from radio reception section 101 from a serial signal into a parallel signal, performs FFT processing on the parallel signal, further converts the result into a serial signal, thereby converts a symbol arrangement in the frequency axis direction in the received signal into a symbol arrangement in the time axis direction, and inputs the received signal subjected to symbol arrangement conversion to channel dividing section 103.

Channel dividing section 103 determines a channel of the received signal inputted from FFT section 102, and thereby determines whether or not the received signal is a pilot signal. Then, when the received signal is the pilot signal, channel dividing section 103 inputs the received signal to reception quality measuring section 106. Meanwhile, when the received signal is not the pilot signal, channel dividing section 103 inputs the received signal to demodulation section 104.

Demodulation section 104 demodulates the received signal inputted from channel dividing section 103 with a predetermined scheme, and inputs the demodulated received signal to decoding section 105.

Decoding section 105 decodes the received signal inputted from demodulation section 104 with a predetermined scheme, generates reception data, and inputs the generated reception data to response determining section 107, and a control section and the like not shown.

Reception quality measuring section 106 measures reception quality, for example, Signal-to-Interference power Ratio (SIR) or reception power level of the pilot signal inputted from channel dividing section 103 for each sub-carrier group—for each sub-channel defined by a class of frequency in an OFDM signal—and reports the measurement result to using sub-channel selecting section 108.

Response determining section 107 detects a timing at which an access request signal is transmitted from radio transmission section 116, performs error detection by Cyclic Redundancy Checking (CRC) on the reception data inputted from decoding section 105, and thereby determines whether an access permission signal is transmitted from the base station apparatus within a predetermined response waiting period from the transmission timing of the access request signal. Further, when the access request signal is first transmitted to the base station apparatus, response determining section 107 reports to using sub-channel selecting section 108 that the number of retransmissions of the access request signal is zero. Further, when determining that an access permission signal is not transmitted from the base station apparatus within the predetermined response waiting period from the transmission timing of the first access request signal, response determining section 107 counts the number of retransmissions of the access request signal as one, and reports to using sub-channel selecting section 108 that the number of retransmissions of next transmitted access request signal is one after a lapse of the response waiting period. Then, response determining section 107 increases the number of retransmissions of the access request signal by one whenever the response waiting period has lapsed for each access request signal until the base station apparatus transmits an access permission signal in response to the sequentially transmitted access request signals, and reports the counted number of retransmissions to using sub-channel selecting section 108. Further, when determining that the access permission signal is transmitted from the base station apparatus within the response waiting period of the access request signal, response determining section 107 reports the determination result to using sub-channel selecting section 108.

When the number of retransmissions reported from response determining section 107 is zero, using sub-channel selecting section 108 selects a sub-channel with the highest reception quality reported for each sub-channel from reception quality measuring section 106, and reports the selected sub-channel to sub-channel assigning section 113. Further, when the number of retransmissions reported from response determining section 107 is one or more, using sub-channel selecting section 108 selects a sub-channel with lower reception quality corresponding to the reported number of retransmissions from the highest reception quality based on the reception quality reported for each sub-channel from reception quality measuring section 106 on the pilot signal that is received after the access request signal is last transmitted, and reports the selected sub-channel to sub-channel assigning section 113. Further, using sub-channel selecting section 108 reports a transmission power level associated with the reception quality of thus selected sub-channel to transmission power control section 114. In addition, the reception quality of the sub-channel reported from reception quality measuring section 106 is associated with the transmission power level of the access request signal in advance, so that the transmission power level of the access request signal decreases in accordance with an increase in the reported reception quality. Further, when response determining section 107 reports the determination result that the access permission signal is transmitted, using sub-channel selecting section 108 reports the determination result to channel assigning section 113, and reports the transmission power level associated with the reception quality to transmission power control section 114 based on the reception quality for each sub-channel on the pilot signal subsequently reported from reception quality measuring section 106.

Coding section 111-1 encodes the access request signal inputted from the control section and the like not shown with a predetermined scheme, and inputs the coded access request signal to modulation section 112-1. Further, coding section 111-2 encodes transmission data inputted from the control section and the like not shown with a predetermined scheme, generates a transmission signal, and inputs the generated transmission signal to modulation section 112-2.

Modulation section 112-1 modulates the access request signal inputted from coding section 111-1 with a predetermined scheme, and inputs the modulated access request signal to sub-channel assigning section 113. Further, modulation section 112-2 modulates the transmission signal inputted from coding section 111-2 with a predetermined scheme, and inputs the modulated transmission signal to sub-channel assigning section 113.

Sub-channel assigning section 113 assigns the sub-channel—sub-carrier group—or frequency reported from using sub-channel selecting section 108 to the modulated access request signal inputted from modulation section 112-1, and inputs the access request signal to which the sub-channel is assigned to transmission power control section 114. Further, when using sub-channel selecting section 108 reports the determination result that the access permission signal is transmitted, sub-channel assigning section 113 assigns the transmission signal inputted from modulation section 112-2 to a sub-channel instructed from the control section and the like not shown or a predetermined sub-channel and inputs the result to transmission power control section 114.

Transmission power control section 114 amplifies the access request signal or transmission signal inputted from sub-channel assigning section 113 to a transmission power level reported from using sub-channel selecting section 108, and inputs the amplified access request signal or transmission signal to IFFT section 115.

IFFT section 115 converts the access request signal or transmission signal inputted from transmission power control section 114 into a parallel signal, performs inverse fast Fourier transform on the parallel signal, thereby converts a symbol arrangement in the time axis direction into a symbol arrangement in the frequency axis direction, further converts into a serial signal, generates an OFDM signal, and inputs the generated OFDM signal to radio transmission section 116.

Radio transmission section 116 performs predetermined transmission processing such as digital/analog conversion and frequency conversion on the OFDM signal that is the access request signal or transmission signal inputted from IFFT section 115, and radio transmits the OFDM signal to the base station apparatus via antenna element 117.

The operation of communication terminal apparatus 100 will be described below with reference to FIG. 3.

Figure 3:
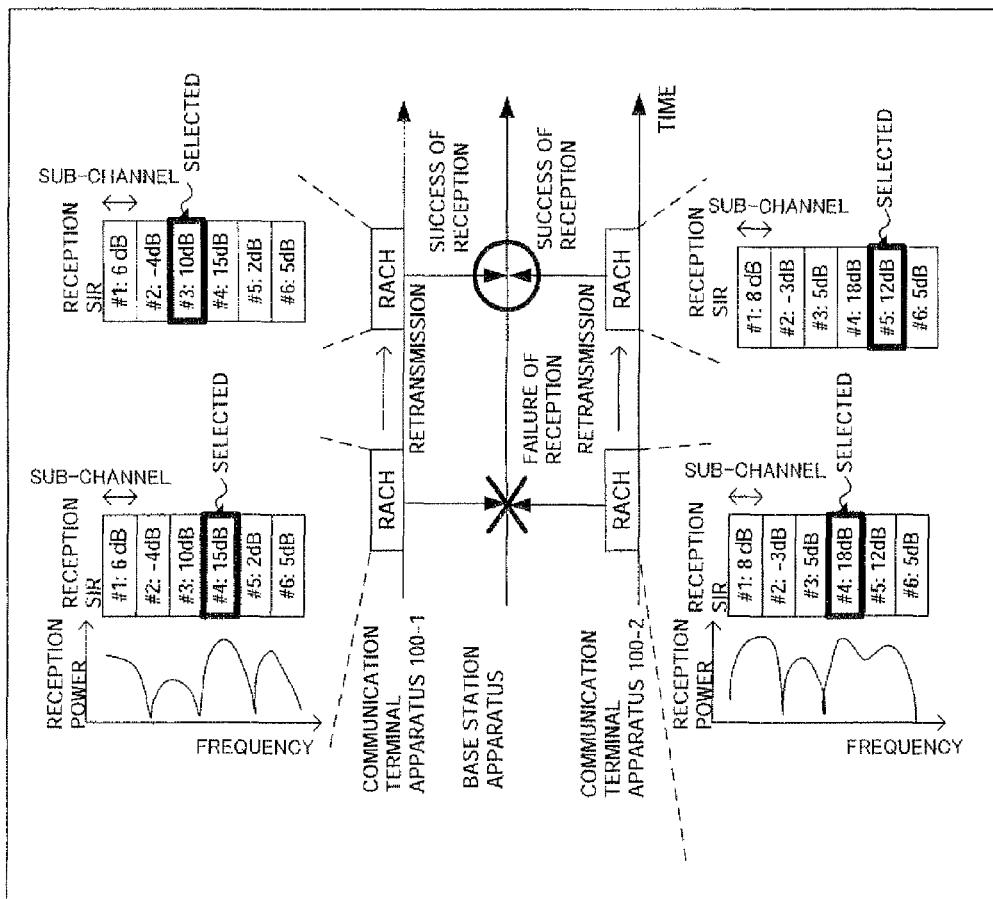
FIG. 3 schematically shows the operation of the communication terminal apparatus upon start of communication according to Embodiment 1 of the present invention.

In FIG. 3, it is assumed that communication terminal apparatuses 100-1 and 100-2 concurrently transmit access request signals to the same base station apparatus, and that the reception SIR is measured for each sub-channel in the pilot signal in reception quality measuring section 106 of each of communication terminal apparatuses 100-1 and 100-2. Further, it is assumed in FIG. 3 that in communication terminal apparatus 100-1, with respect to the reception SIR for each sub-channel in the pilot signal, due to the effect of frequency selective fading, sub-channel #1 is 6 dB, sub-channel #2 is −4 dB, sub-channel #3 is 10 dB, sub-channel #4 is 15 dB, sub-channel #5 is 2 dB, and sub-channel #6 is 5 dB. Similarly, it is assumed that in communication terminal apparatus 100-2, with respect to the reception SIR for each sub-channel in the pilot signal, sub-channel #1 is 8 dB, sub-channel #2 is −3 dB, sub-channel #3 is 5 dB, sub-channel #4 is 18 dB, sub-channel #5 is 12 dB, and sub-channel #6 is 5 dB. It is further assumed in FIG. 3 that the reception SIR of the first received pilot signal is the same as the reception SIR of the subsequently received pilot signal in communication terminal apparatuses 100-1 and 100-2.

In FIG. 3, in first transmitting access request signals, each of communication terminal apparatuses 100-1 and 100-2 selects a sub-channel with the highest reception SIR in the pilot signal, and thus selects the same sub-channel #4. Therefore, neither of the access request signals first transmitted from communication terminal apparatuses 100-1 and 100-2 can be received in the base station apparatus. As a result, neither of communication terminal apparatuses 100-1 and 100-2 can receive access permission signals in response to the first access request signals within a response waiting period, and therefore, upon reception of a next pilot signal, access request signals are retransmitted. In retransmission of the access request signals, each of communication terminal apparatuses 100-1 and 100-2 selects a sub-channel with the lower reception SIR of the pilot signal corresponding to the number of retransmissions from the highest reception quality. Therefore, communication terminal apparatus 100-1 selects sub-channel #3, and communication terminal apparatus 100-2 selects sub-channel #5. Accordingly, the base station apparatus receives both the access request signals retransmitted from communication terminal apparatuses 100-1 and 100-2.

Thus, according to communication terminal apparatus 100 according to this Embodiment, a different sub-channel is selected according to the number of retransmissions, and an access request signal is transmitted or retransmitted using the selected sub-channel, so that it is possible to decrease the probability of occurrence of collision of access request signals. As a result, according to communication terminal apparatus 100 according to the present invention, it is not necessary to set a random back-off time upon retransmission of the access request signal, and it is possible to reduce the number of retransmissions of the access request signal, so that it is possible to start the communication in a short time, suppress reduction in throughput in the radio communication system, and improve the communication quality in packet communication having exacting delay requirement, such as speech communication and video transmission.

Further, according to communication terminal apparatus 100 according to this Embodiment, OL-TPC is performed on the access request signal and transmission signal based on the reception SIR of the pilot signal, so that, for example, when communication terminal apparatus 100 is a mobile telephone and located near the cell edge, it is possible to prevent an access request signal and transmission signal transmitted from communication terminal apparatus 100 from being an interfering signal in adjacent other cells and reducing the throughput. Furthermore, according to communication terminal apparatus 100 according to this Embodiment, a sub-channel for use in transmission of an access request signal is selected in descending order of the reception SIR according to the number of retransmissions, and therefore the transmission power of the access request signal becomes larger starting with the minimum value, so that it is possible to further reduce the interference imposed on adjacent other cells, and as a result, effectively prevent reduction in throughput due to interference in other cells.

Moreover, according to communication terminal apparatus 100 according to this Embodiment, the scheme of selecting a sub-channel is changed in the case of first transmitting an access request signal and in the case of retransmitting the access request signal after collision of access request signals occurs, so that it is possible to further decrease the probability of occurrence of collision of access request signals in the case of retransmitting the access request signal.

In addition, in this Embodiment the case has been described where using sub-channel selecting section 108 changes the scheme of selecting a sub-channel according to the number of retransmissions of the access request signal reported from response determining section 107, but the present invention is not limited to this case. For example, using sub-channel selecting section 108 may continuously select a sub-channel with the highest reception quality even when the number of retransmissions of the access request signal reported from response determining section 107 is one or more. By this means, it is possible to reduce the load of signal processing required for selection of sub-channel on using sub-channel selecting section 108. In this regard, when such selection is made in the case where the fading fluctuation is fast on the propagation path, the probability of occurrence of collision of access request signals is further reduced.

Embodiment 2

Figure 4:
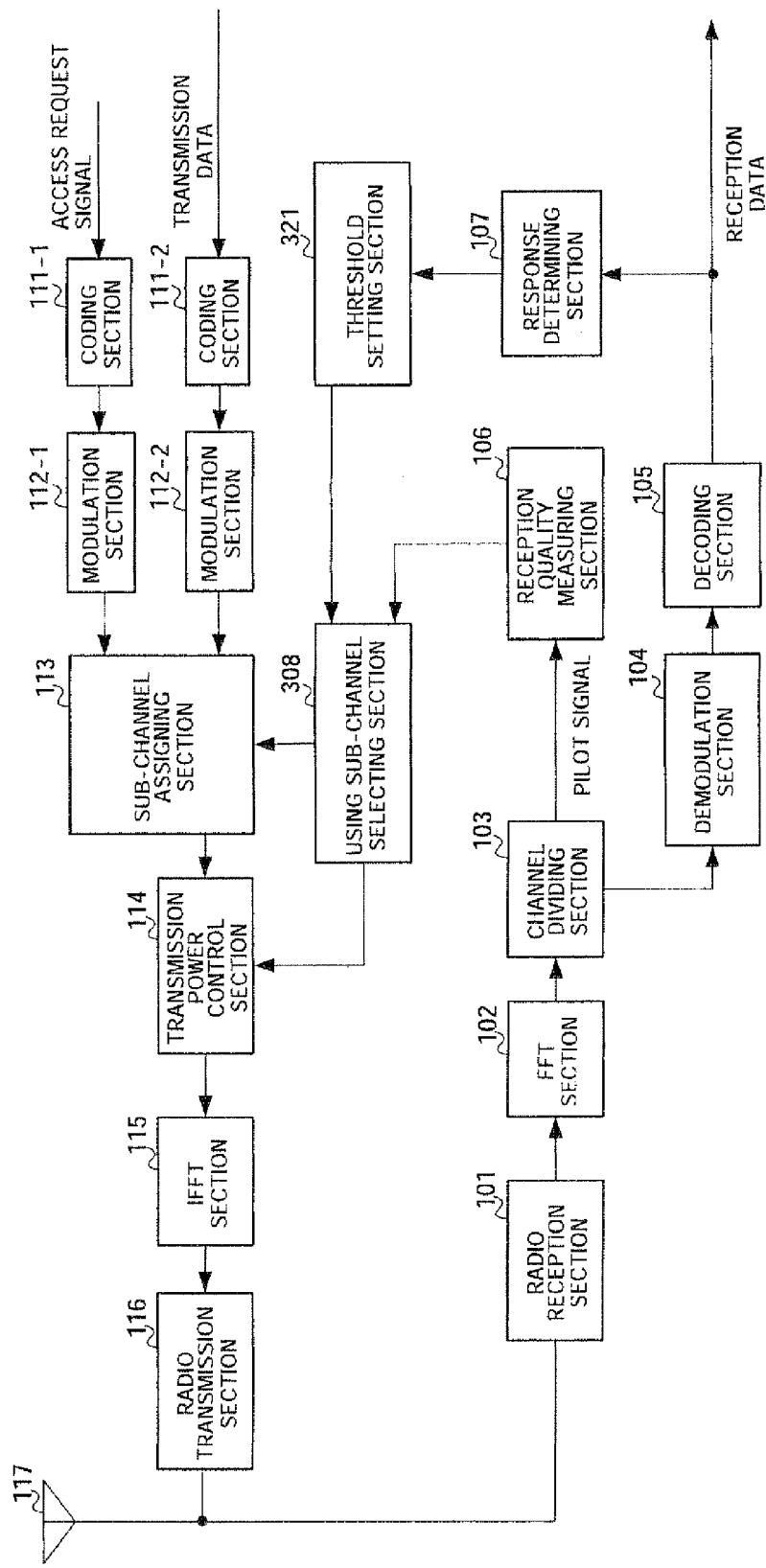
FIG. 4 is a block diagram illustrating a configuration of a communication terminal apparatus according to Embodiment 2 of the present invention.

FIG. 4 is a block diagram illustrating a configuration of communication terminal apparatus 300 according to Embodiment 2 of the present invention. Communication terminal apparatus 300 has using sub-channel selecting section 308 instead of using sub-channel selecting section 108, and threshold setting section 321 between response determining section 107 and using sub-channel selecting section 308 in communication terminal apparatus 100 according to Embodiment 1.

Based on the reception quality for each sub-channel reported from reception quality measuring section 106, using sub-channel selecting section 308 randomly selects one from a group of sub-channels with the reception quality more than or equal to a threshold reported from threshold setting section 321, and reports the selected sub-channel to sub-channel assigning section 113. Further, using sub-channel selecting section 308 reports a transmission power level associated with the reception quality of the selected sub-channel to transmission power control section 114.

According to the number of retransmissions, n, reported from response determining section 107, threshold setting section 321 reports a threshold calculated, for example, from an equation of "threshold=$\alpha$ dB−n×$\beta$ dB" where $\alpha$ dB is an initial value, and $\beta$ dB is a variable coefficient, to using sub-channel selecting section 309. In addition, the initial value is set at 5 dB ($\alpha$ dB=5 dB) and the variable coefficient is set at 2 dB ($\beta$ dB=2 dB) in the following descriptions.

The operation of communication terminal apparatus 300 will be described below with reference to FIGS. 5 and 6.

Figure 5:
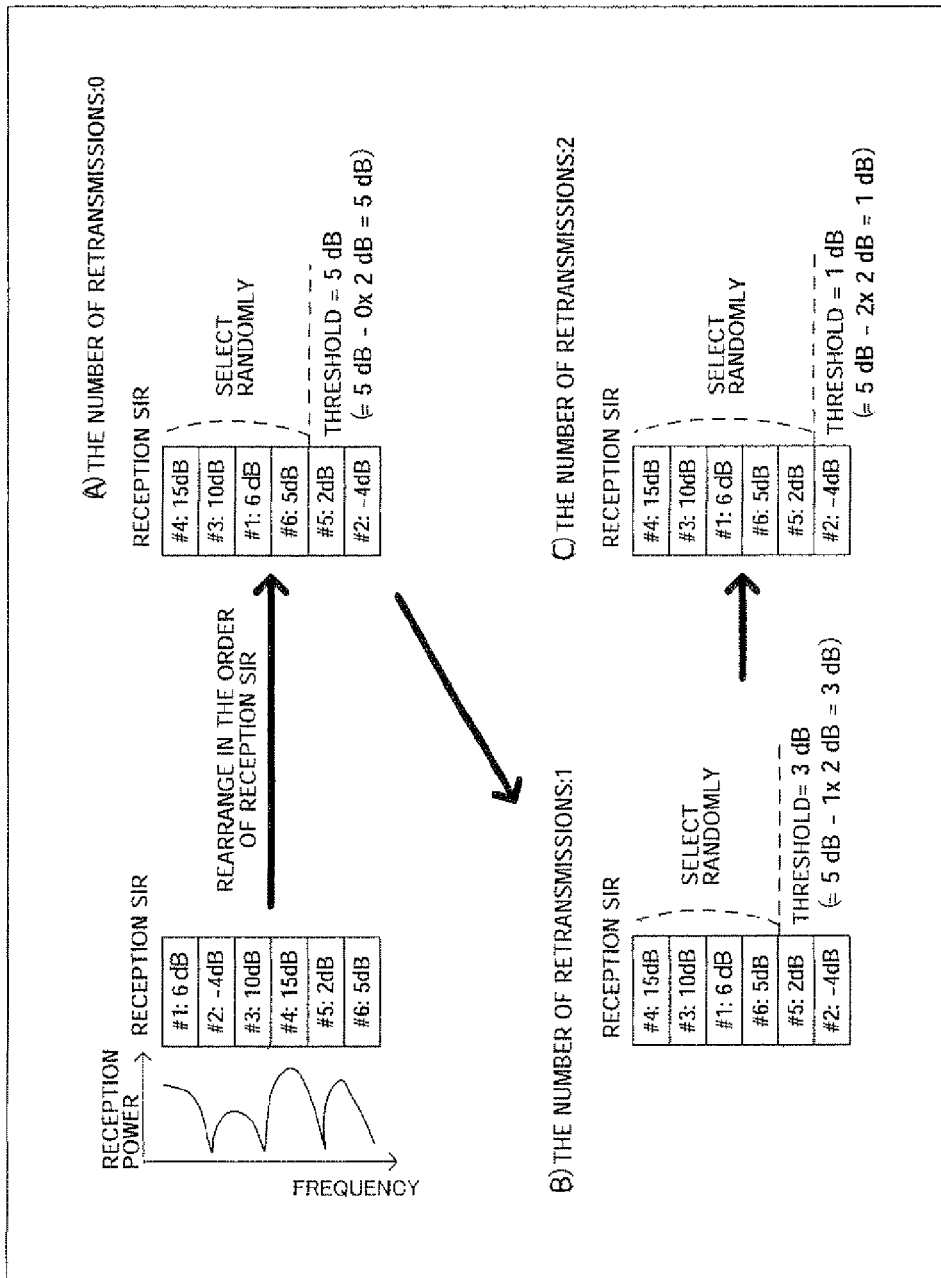
FIG. 5 schematically shows the operation of the communication terminal apparatus upon start of communication according to Embodiment 2 of the present invention.

FIG. 5 shows the reception SIR for each sub-channel in the pilot signal measured in communication terminal apparatus 300. In addition, the reception SIR for each sub-channel as shown in FIG. 5 is the same as that in FIG. 3.

When an access request signal is first transmitted, it is reported that the number of retransmissions is zero from response determination section 107, and therefore threshold setting section 321 reports the threshold=5 dB−0×2 dB=5 dB to using sub-channel selecting section 308. Then, using sub-channel selecting section 308 randomly selects one from sub-channel #1 of 6 dB, sub-channel #3 of 10 dB, sub-channel #4 of 15 dB and sub-channel #6 of 5 dB which have the reception SIR more than or equal to 5 dB, reports the selected sub-channel to channel assigning section 113, and further reports a transmission power level associated with the reception SIR to transmission power control section 114.

Similarly, threshold setting section 321 reports the threshold=5 dB−1×2 dB=3 dB to using sub-channel selecting section 308 when it is reported that the number of retransmissions is one from response determining section 107, and reports the threshold=5 dB−2×2 dB=1 dB to using sub-channel selecting section 308 when it is reported that the number of retransmissions is two from response determining section 107. Then, as shown in FIGS. 5(B) and 5(C), using sub-channel selecting section 308 randomly selects one from sub-channels with the reception SIR more than or equal to 3 dB or 1 dB, respectively, reports the selected sub-channel to channel assigning section 113, and further reports a transmission power level associated with the reception SIR to transmission power control section 114.

Figure 6:
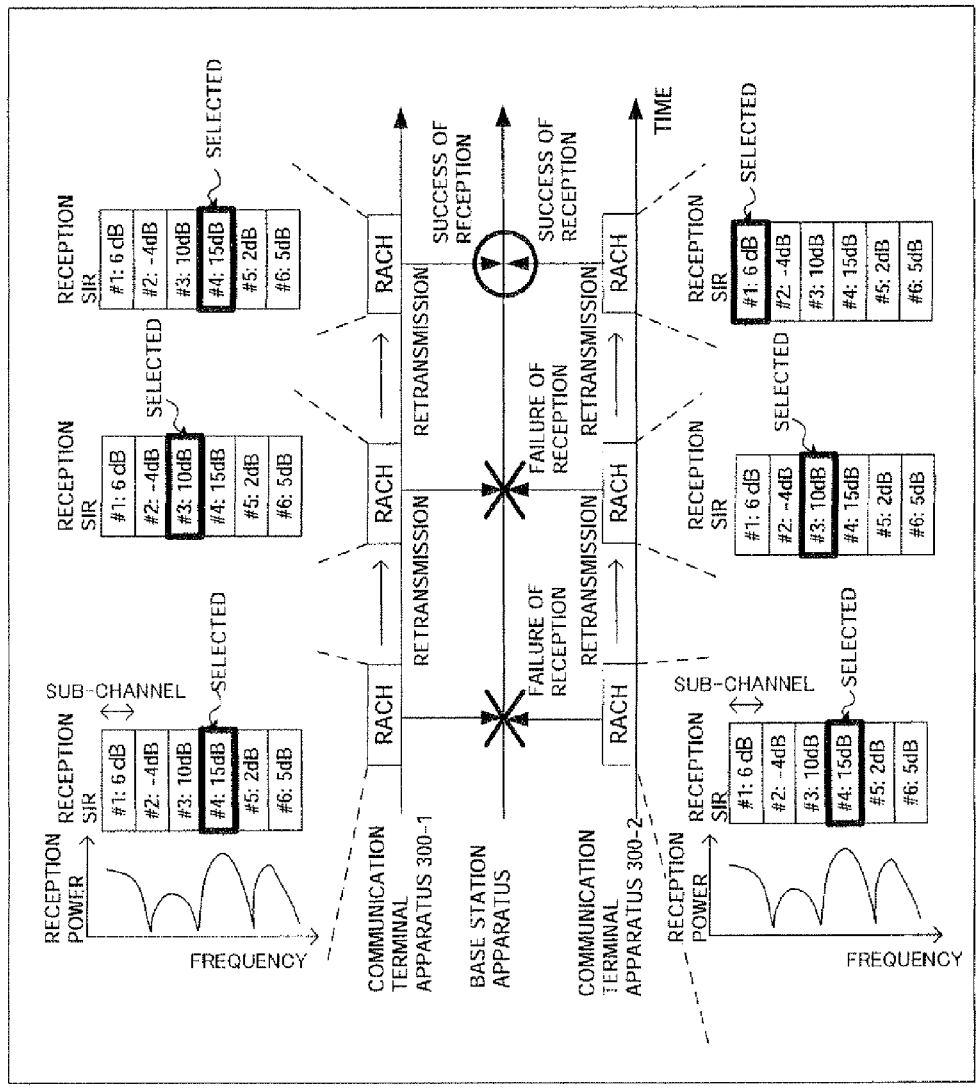
FIG. 6 schematically shows the operation of the communication terminal apparatus upon start of communication according to Embodiment 2 of the present invention.

FIG. 6 shows an example of a mode where the reception SIR measured for each sub-channel in the pilot signal in communication terminal apparatuses 300-1 and 300-2 is as shown in FIG. 5, and communication terminal apparatuses 300-1 and 300-2 concurrently transmit and retransmit access request signals to the same base station apparatus. In the example as shown in FIG. 6, both of communication terminal apparatuses 300-1 and 300-2 select sub-channel #4 when the number of retransmissions is zero corresponding to FIG. 5(A), and select sub-channel #3 when the number of retransmissions is one corresponding to FIG. 5(B), and in theses cases, the access request signals cannot be received in the base station apparatus. Then, when the number of retransmissions is two corresponding to FIG. 5(C), communication terminal apparatus 300-1 selects sub-channel #4, and communication terminal apparatus 300-2 selects sub-channel #1, and therefore access request signals of the apparatuses 300-1 and 300-2 are both received in the base station apparatus for the first time.

In this Embodiment, when the threshold used in using sub-channel selecting section 308 is made smaller, the probability increases that the access request signal is transmitted or retransmitted using a sub-channel with a low reception SIR, and therefore an error rate of the access request signal increases in the base station apparatus, and the probability increases that the access request signal is retransmitted. Meanwhile, when the threshold used in using sub-channel selecting section 308 is made larger, an error rate of the access request signal decreases in the base station apparatus, and therefore the probability is expected to decrease that the access request signal is retransmitted. However, the number of sub-channels decreases that can be selected in using sub-channel selecting section 308, and therefore the probability of occurrence of collision of access request signals increases, and, as a result, it is considered that the probability may increase that the access request signal is retransmitted. Further, the probability that the access request signal is retransmitted is affected by an interfering amount and level of noise in the radio communication system. Therefore, in this Embodiment, with respect to the threshold used upon selection of a sub-channel in using sub-channel selecting section 308, by selecting the threshold so that the probability that the access request signal is retransmitted becomes the lowest, more specifically, by decreasing the threshold in accordance with increases in the number of retransmissions of the access request signal, it is possible to adapt to tradeoff existing in adjusting the threshold and the interfering amount and level of noise in the radio communication system.

Thus, according to communication terminal apparatus 300 according to this Embodiment, in accordance with increases in the number of retransmissions of the access request signal, the threshold used in selecting a sub-channel in using sub-channel selecting section 308 is adjusted to be smaller gradually, so that it is possible to decrease the probability of occurrence of collision of access request signals without making the transmission power level of the access request signal higher than necessary.

Hence, according to communication terminal apparatus 300 according to this Embodiment, it is possible to decrease the probability of occurrence of collision of access request signals without making the transmission power level of the access request signal higher than necessary, so that, even when communication terminal apparatus 300 is a mobile telephone and the like located near the cell edge, it is possible to further prevent an access request signal transmitted from communication terminal apparatus 300 from being an interfering signal in other adjacent cells and reducing throughput in the other cells.

In addition, in communication terminal apparatus 300 according to this Embodiment, the average reception power of the pilot signal decreases in accordance with an increase in distance from the base station apparatus, and therefore, when the threshold used upon selection of a sub-channel in using sub-channel selecting section 308 is larger than the average reception power, the number of sub-channels decreases that using sub-channel selecting section 308 can select. Therefore, in communication terminal apparatus 300 according to this Embodiment, the threshold used upon selection of a sub-channel in using sub-channel selecting section 308 may be a relative value to the average reception power of the pilot signal.

Embodiment 3

Figure 7:
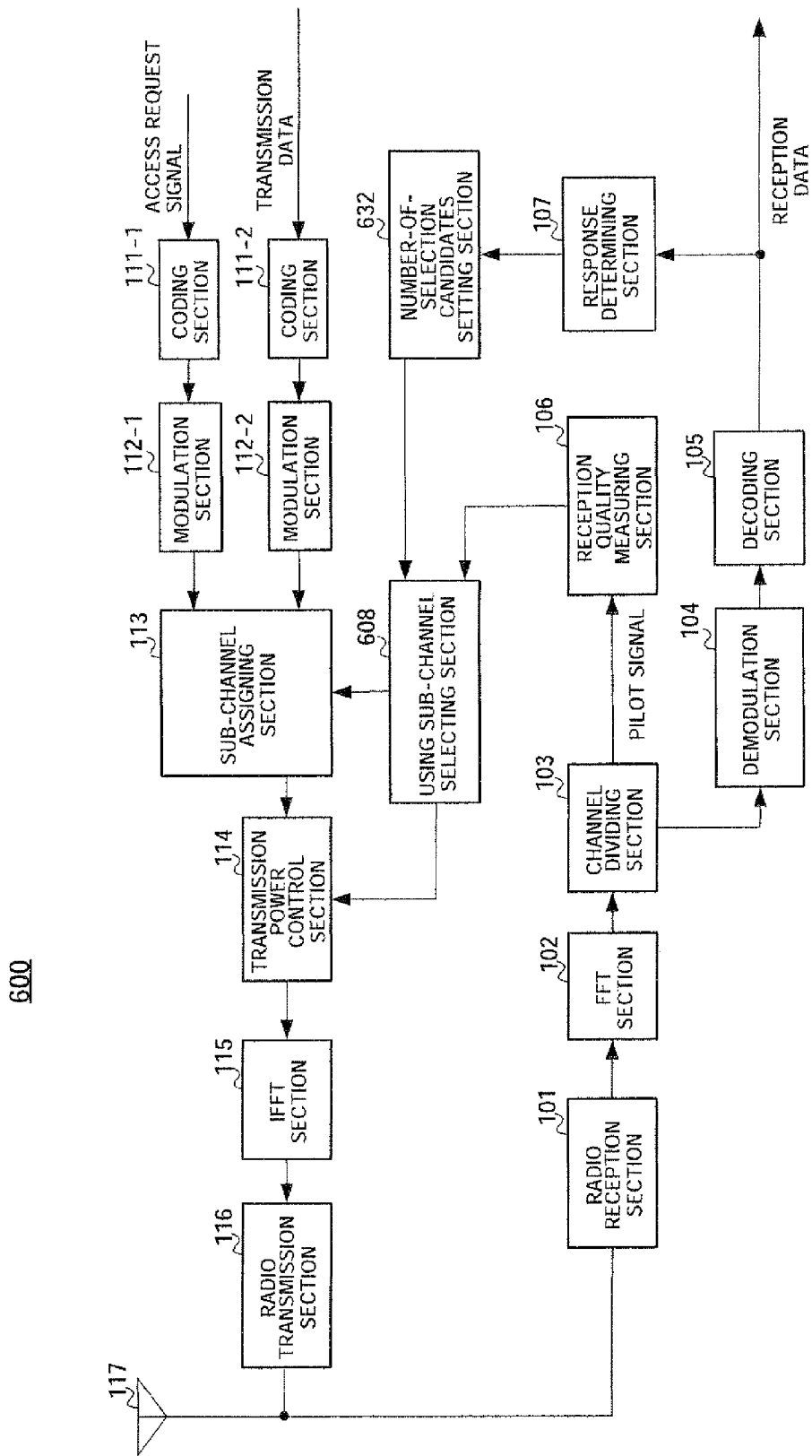
FIG. 7 is a block diagram illustrating a configuration of a communication terminal apparatus according to Embodiment 3 of the present invention.

FIG. 7 is a block diagram illustrating a configuration of communication terminal apparatus 600 according to Embodiment 3 of the present invention. Communication terminal apparatus 600 has using sub-channel selecting section 608 instead of using sub-channel selecting section 108, and has number-of-selection candidates setting section 632 between response determining section 107 and using sub-channel selecting section 608 in communication terminal apparatus 100 according to Embodiment 1.

Based on the reception quality for each sub-channel reported from reception quality measuring section 106, using sub-channel selecting section 608 randomly selects one from a group of sub-channels with higher reception quality where the number of sub-channels is within the sum of M and n reported from number-of-selection candidates setting section 632, reports the selected sub-channel to sub-channel assigning section 113, and further reports a transmission power level associated with the reception quality of the selected sub-channel to transmission power control section 114.

Number-of-selection candidates setting section 632 adds the number of retransmissions n reported from response determining section 107 to a natural number M smaller than the total number of sub-channels in the received pilot signal, and reports the value of M+n to using sub-channel selecting section 608. In addition, M is assumed to be five (M=5) in the following descriptions, and number-of-selection candidates setting section 632 reports that M+n=5 when the number of retransmissions is zero to using sub-channel selecting section 608, and reports that M+n=6 when the number of retransmissions is one.

Figure 8:
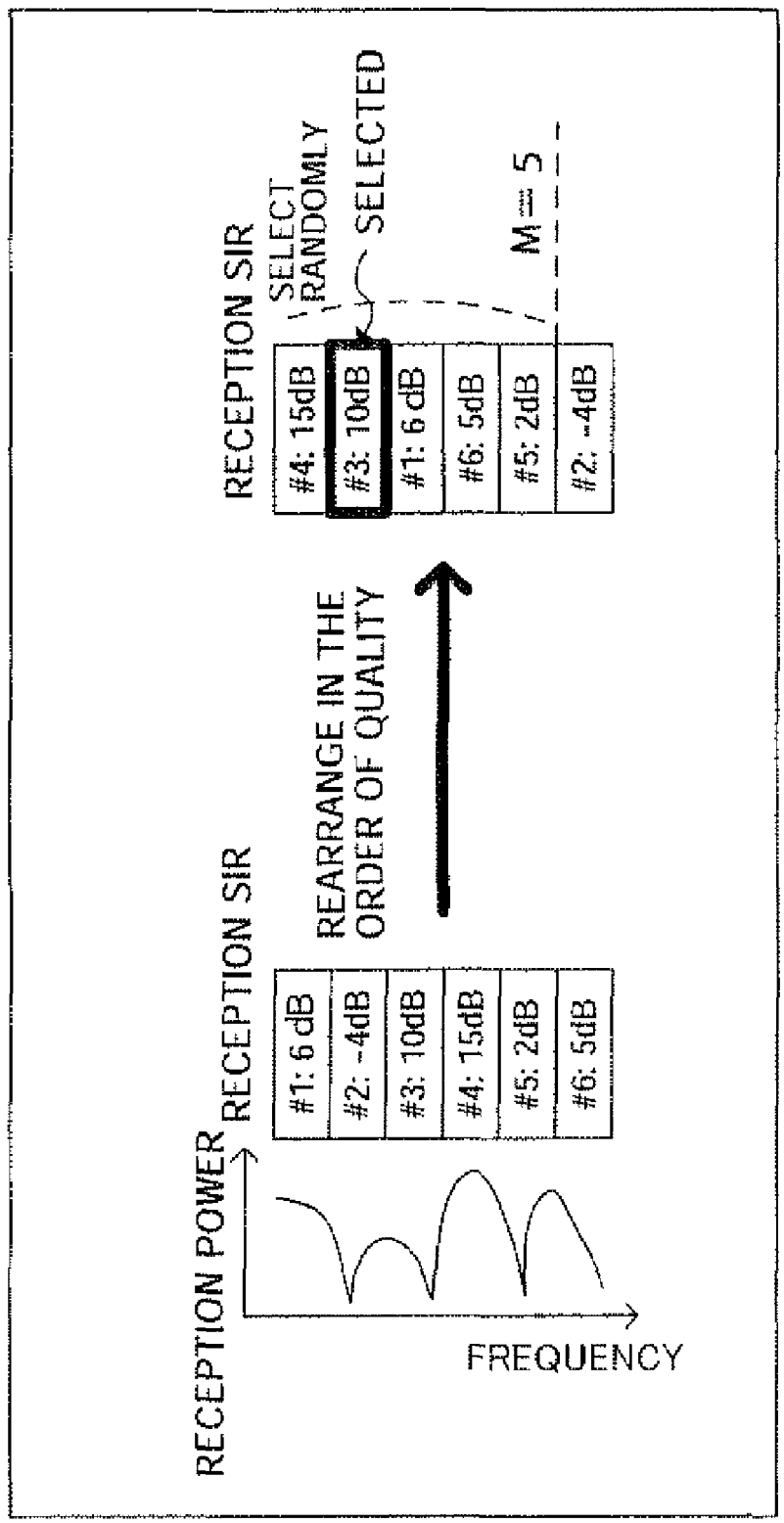
FIG. 8 schematically shows the operation of the communication terminal apparatus upon start of communication according to Embodiment 3 of the present invention.

The operation of communication terminal apparatus 600 will be described below with reference to FIG. 8. FIG. 8 shows the reception SIR for each sub-channel in the pilot signal measured in communication terminal apparatus 600.

In addition, the reception SIR for each sub-channel as shown in FIG. 8 is the same as that in FIG. 3. Accordingly, upon first transmission of the access request signal, using sub-channel selecting section 608 randomly selects one, for example, sub-channel #3, from five sub-channels except sub-channel #2 of −4 dB that is the lowest reception SIR, reports that the selected sub-channel is sub-channel #3 to sub-channel assigning section 113, and further reports a transmission power level associated with the reception SIR of sub-channel #3 to transmission power control section 114. Similarly, when the number of retransmissions of the access request signal is one, using sub-channel selecting section 608 is capable of selecting randomly one from all of sub-channels #1 to #6.

Thus, according to communication terminal apparatus 600, even when the average reception power of the pilot signal is low, a predetermined number of sub-channels that are candidates for selection in using sub-channel selecting section 608 are reserved, so that it is possible to effectively decrease the probability of occurrence of collision of access request signals. Further, according to communication terminal apparatus 600 according to this Embodiment, a sub-channel to transmit or retransmit the access request signal is selected randomly from sub-channels in descending order of the reception quality, and therefore the transmission power is set to be low, so that it is possible to reduce interference imposed on adjacent other cells. By this means, according to communication terminal apparatus 600 according to this Embodiment, it is possible to effectively prevent reduction in throughput in adjacent other cells.

Embodiment 4

Figure 9:
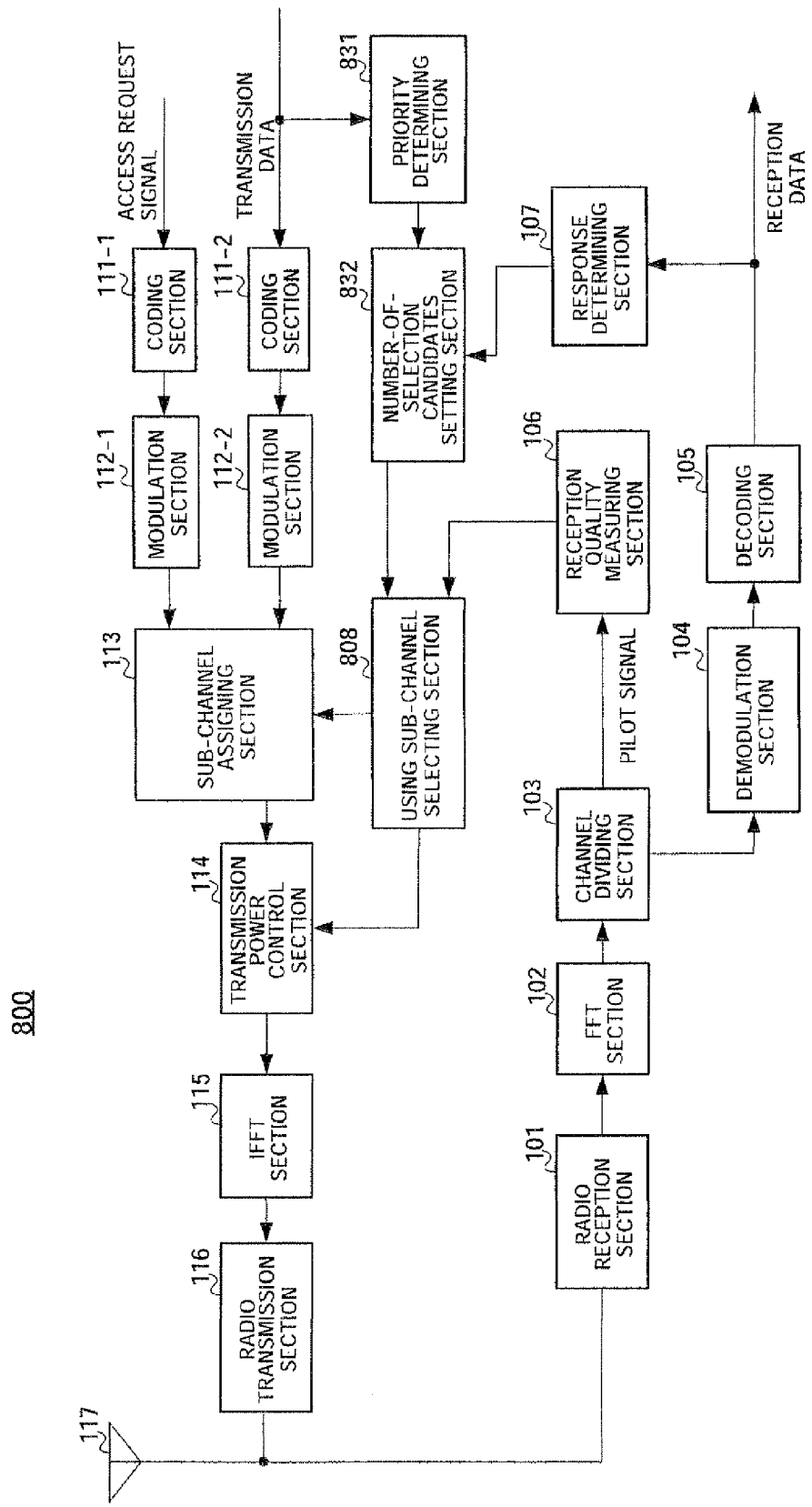
FIG. 9 is a block diagram illustrating a configuration of a communication terminal apparatus according to Embodiment 4 of the present invention.

FIG. 9 is a block diagram illustrating a configuration of communication terminal apparatus 800 according to Embodiment 4 of the present invention. Communication terminal apparatus 800 has using sub-channel selecting section 808 instead of using sub-channel selecting section 108, and has priority determining section 831 and number-of-selection candidates setting section 832 in communication terminal apparatus 100 according to Embodiment 1.

Using sub-channel selecting section 808 first divides the reception quality for each sub-channel reported from reception quality measuring section 106 into a plurality of sub-channel groups, for example, a group of sub-channels with low frequencies and a group of sub-channels with high frequencies. Further, using sub-channel selecting section 808 selects the divided low-frequency sub-channel group or high-frequency sub-channel group based on a determination result on transmission data by priority determining section 831 reported from number-of-selection candidates setting section 832, described later. Furthermore, in the selected sub-channel group, based on the reception quality for each sub-channel reported from reception quality measuring section 106, using sub-channel selecting section 808 randomly selects one from the group of sub-channels with higher reception quality where the number of sub-channels is within the sum of M and n reported from number-of-selection candidates setting section 832 described later, reports the selected sub-channel to sub-channel assigning section 113, and further reports a transmission power level associated with the reception quality of the selected sub-channel to transmission power control section 114.

Priority determining section 831 determines the priority by judging a type of transmission data inputted from the control section and the like not shown. More specifically, priority determining section 831 determines that inputted transmission data is transmission data with a high priority when the transmission data is data having exacting delay requirement, such as speech packet data, and determines that the inputted transmission data is transmission data with a low priority when the transmission data is Web data and the like, and reports the determination result to number-of-selection candidates setting section 832.

Number-of-selection candidates setting section 832 reports the determination result on the priority of the transmission data reported from priority determining section 831 to using sub-channel selecting section 808, and based on the determination result, sets a natural number M smaller than the total number of sub-channels of each of the high-frequency sub-channel group and the low-frequency sub-channel group that are divided by using sub-channel selecting section 808. Then, using sub-channel selecting section 808 adds the number of retransmissions n reported from response determining section 107 to the set number M, and reports the value of M+n to sub-channel selecting section 808.

Figure 10:
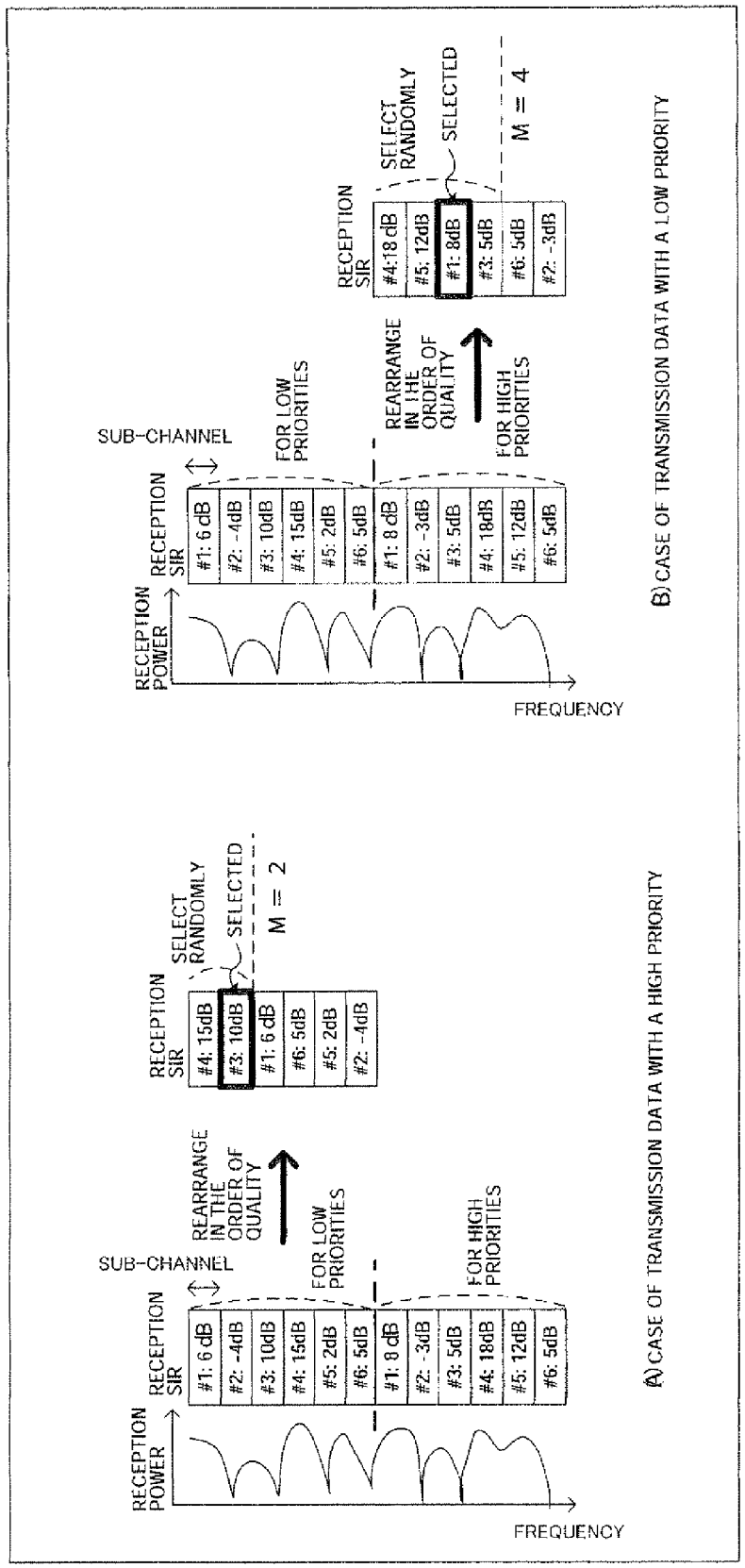
FIG. 10 schematically shows the operation of the communication terminal apparatus upon start of communication according to Embodiment 4 of the present invention.

The operation of communication terminal apparatus 800 will be described below with reference to FIG. 10. FIG. 10 shows the reception SIR for each sub-channel in the pilot signal measured in communication terminal apparatus 800. In this Embodiment, as shown in FIG. 10, a pilot signal is configured with twelve sub-channels, and a sub-channel group configured with six sub-channels with low frequencies is assigned to communication terminal apparatus 800 with a low priority of transmission data, and a sub-channel group configured with six sub-channels with high frequencies is assigned to communication terminal apparatus 800 with a high priority of transmission data. In FIG. 10, with respect to the reception SIR for each sub-channel in the low-frequency sub-channel group, due to the effect of the frequency selective fading, sub-channel #1 is 6 dB, sub-channel #2 is −4 dB, sub-channel #3 is 10 dB, sub-channel #4 is 15 dB, sub-channel #5 is 2 dB, and sub-channel #6 is 5 dB. Meanwhile, for the reception quality for each sub-channel in the high-frequency sub-channel group, sub-channel #1 is 8 dB, sub-channel #2 is −3 dB, sub-channel #3 is 5 dB, sub-channel #4 is 18 dB, sub-channel #5 is 12 dB, and sub-channel #6 is 5 dB.

Then, in the case of the transmission data with the low priority as shown in FIG. 10(A), a mode is shown where number-of-selection candidates setting section 832 sets M at two (M=2) when the number of retransmissions of the access request signal is zero, and using sub-channel selecting section 808 selects sub-channel #3 of 10 dB or sub-channel #4 of 15 dB that are of two higher reception SIRs in the low-frequency sub-channel group, and as a result, selects sub-channel #3. In the case of the transmission data with the high priority as shown in FIG. 10(B), another mode is shown where number-of-selection candidates setting section 832 sets M at four (M=4) when the number of retransmissions of the access request signal is zero, and using sub-channel selecting section 808 selects one of sub-channel #1 of 8 dB, sub-channel #3 of 5 dB, sub-channel #4 of 18 dB and sub-channel #5 of 12 dB that are of four higher reception SIRs in the high-frequency sub-channel group, and as a result, selects sub-channel #1. In other words, as shown in FIG. 10, it does not happen that communication terminal apparatuses 800 with different priorities of transmission data use the same sub-channel to transmit the access request signals.

Thus, according to communication terminal apparatus 800 according to this Embodiment, using sub-channel selecting section 808 divides in advance the reception quality for each sub-channel reported from reception quality measuring section 106 into a high-frequency sub-channel group and a low-frequency sub-channel group, so that it is possible to completely eliminate the risk that collision of access request signals occurs among communication terminal apparatuses 800 with different priorities of transmission data.

Further, according to communication terminal apparatus 800 according to this Embodiment, number-of-selection candidates setting section 832 sets the larger natural number M for transmission data with a high priority than the natural number M for transmission data with a low priority, and therefore, communication terminal apparatus 800 holding transmission data with a higher priority has the lower probability of occurrence of collision of access request signals, and is thus capable of transmitting transmission data held therein to the base station apparatus in a short time.

In addition, in this Embodiment, as shown in FIG. 10, that the case has been described where a same number of sub-channels for use in transmission of the access request signals are assigned to communication terminal apparatus 800 holding high-priority transmission data and communication terminal apparatus 800 holding low-priority transmission data, but the present invention is not limited to this case. For example, a larger number of sub-channels may be assigned to communication terminal apparatus 800 holding transmission data with a high priority.

Embodiment 5

In the above-mentioned Embodiments 1 to 4, the case has been described as an example where an OFDM signal is transmitted or received in the TDD scheme. In Embodiment 5 of the present invention, the case will be described as an example where an OFDM signal is transmitted or received in a frequency division duplex (FDD) scheme.

Figure 11:
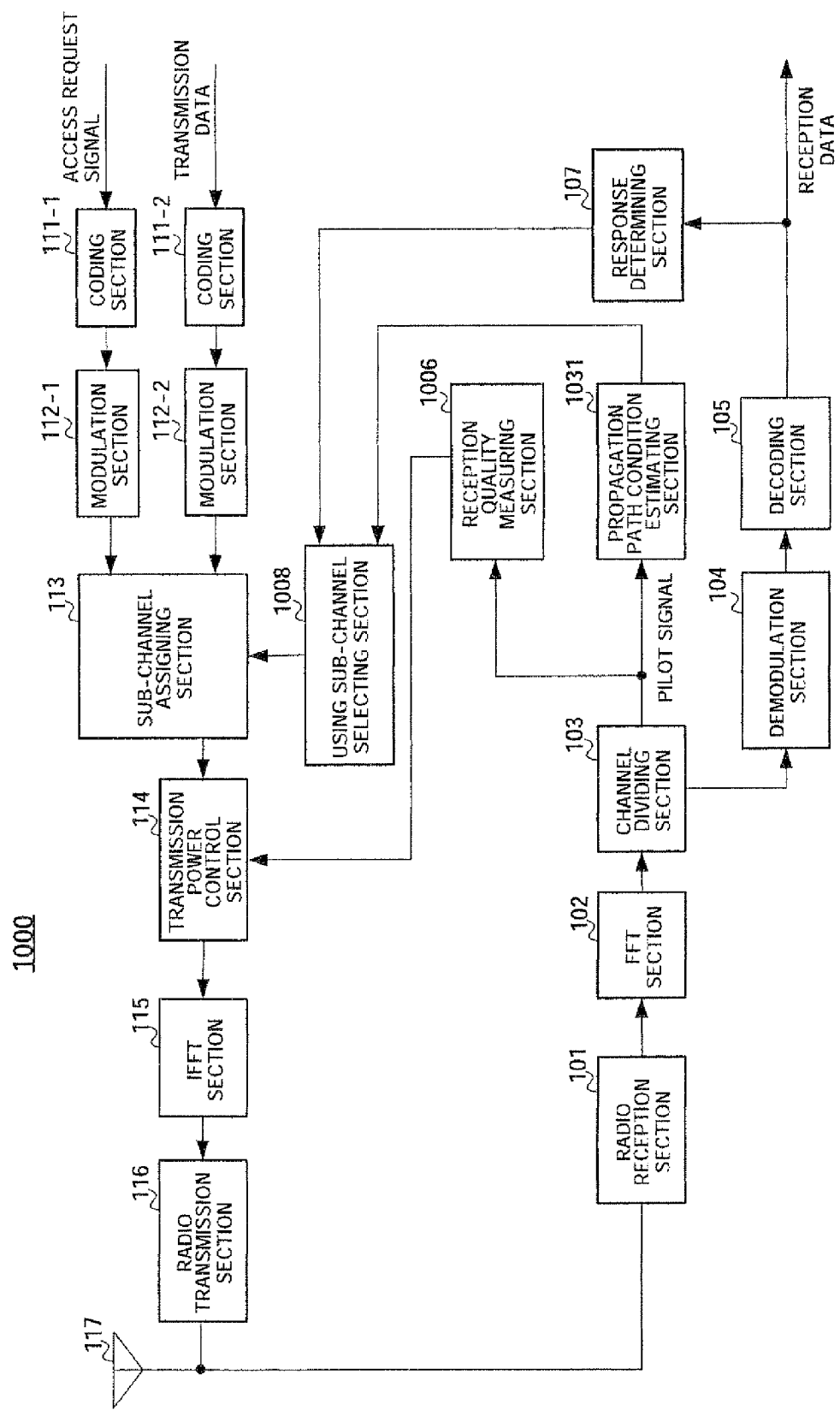
FIG. 11 is a block diagram illustrating a configuration of a communication terminal apparatus according to Embodiment 5 of the present invention.

FIG. 11 is a block diagram illustrating a configuration of communication terminal apparatus 1000 according to Embodiment 5 of the present invention. Communication terminal apparatus 1000 has reception quality measuring section 1006 instead of reception quality measuring section 106, has using sub-channel selecting section 1008 instead of using sub-channel selecting section 108, and further has propagation path condition estimating section 1031 in communication terminal apparatus 100 according to Embodiment 1.

Reception quality measuring section 1006 measures average reception quality, for example, average SIR or average reception power level of the entire band—of all subcarriers in an OFDM signal—using a pilot signal inputted from channel dividing section 103, and reports a transmission power level based on the measurement result to the transmission power control section.

Using the pilot signal inputted from channel dividing section 103, propagation path condition estimating section 1031 estimates frequency selectivity (speed of fading fluctuation in the frequency direction) of the propagation path, and speed of time fluctuation of the propagation path. As a method of estimating the speed, estimation is made based on fluctuation amounts respectively in the frequency direction and time direction of the pilot signal. Further, the frequency selectivity of the propagation path can be estimated from delay spread of arrival signals, and the speed of time fluctuation of the propagation path can be estimated from moving speed of the communication terminal apparatus as a maximum Doppler frequency. In this Embodiment, delay spread and maximum Doppler frequency (fD) are used respectively for estimation of the frequency selectivity of the propagation path and for estimation of the speed of the time fluctuation.

When the number of retransmissions reported from response determining section 107 is zero, using sub-channel selecting section 1008 randomly selects a sub-channel to be used and reports the selected sub-channel to sub-channel assigning section 113. When the number of retransmissions reported from response determining section 107 is one or more, using sub-channel selecting section 1008 randomly selects a sub-channel based on the delay spread and maximum Doppler frequency reported from propagation path condition estimating section 1031. For example, when the delay spread is less than or equal to a predetermined threshold (for example, 100 ns) and the maximum Doppler frequency is less than or equal to a predetermined threshold (for example, 80 Hz), using sub-channel selecting section 1008 selects a sub-channel randomly from sub-channels spaced apart from a sub-channel used in previous transmission by the predetermined number of sub-channels (for example, five sub-channels) or more in the frequency direction. Meanwhile, when the delay spread does not meet a value less than or equal to the predetermined threshold and the maximum Doppler frequency does not meet a value less than or equal to the predetermined threshold, using sub-channel selecting section 1008 selects a sub-channel randomly from sub-channels within a range less than the predetermined number of sub-channels in the frequency direction. In other words, as the delay spread is smaller and the maximum Doppler frequency is lower, a sub-channel in frequency spaced further apart from the sub-channel used in previous transmission is selected.

Herein, it is assumed that a sub-channel is selected other than the sub-channel used in previous transmission. The selected sub-channel is reported to sub-channel assigning section 113.

The operation of communication terminal apparatus 1000 will be described below with reference to FIG. 12.

Figure 12:
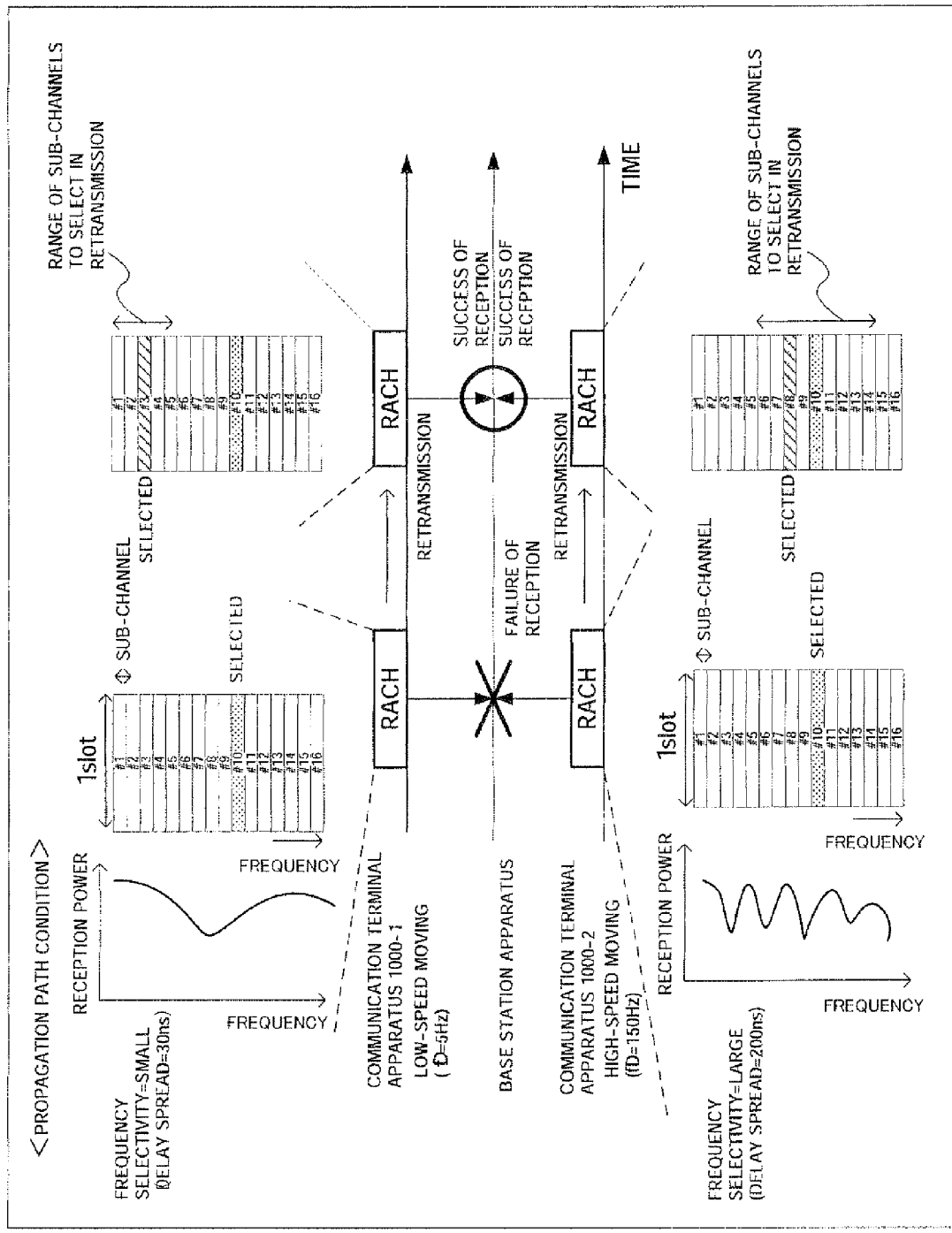
FIG. 12 schematically shows the operation of the communication terminal apparatus upon start of communication according to Embodiment 5 of the present invention.

In FIG. 12, it is assumed that communication terminal apparatuses 1000-1 and 1000-2 both transmit access request signals concurrently to the same base station apparatus, and that communication terminal apparatus 1000-1 moves at a low speed and has small frequency selectively, and communication terminal apparatus 1000-2 moves at a high speed and has large frequency selectively.

In FIG. 12, upon first transmission of an access request signal, as the result of random selection of sub-channel, each of communication terminal apparatuses 1000-1 and 1000-2 selects the same sub-channel #10, and therefore both of first access request signals cannot be received in the base station apparatus. As a result, both of communication terminal apparatuses 1000-1 and 1000-2 cannot receive an access permission signal within a response waiting period on the first access request signal, and retransmit access request signals.

Figure 13:
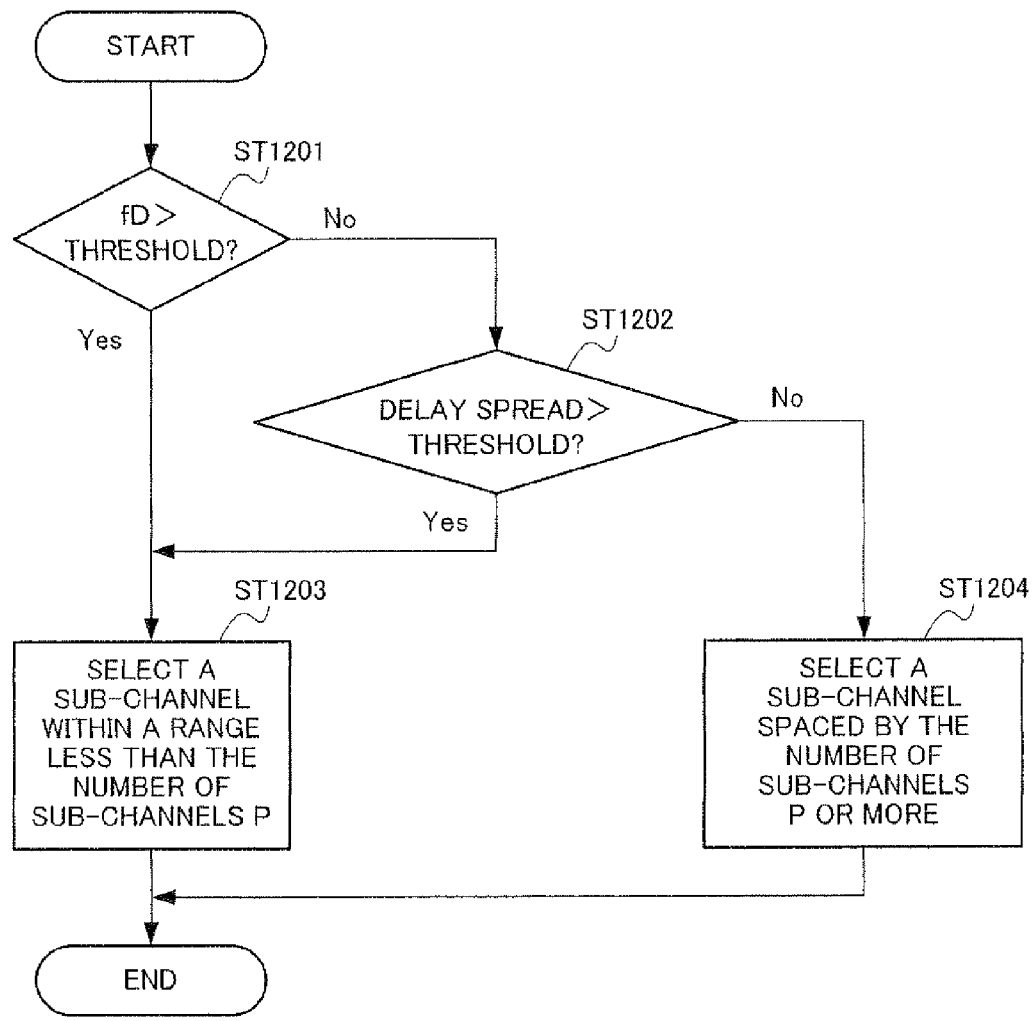
FIG. 13 is flowchart illustrating a method of selecting a sub-channel in a using sub-channel selecting section as shown in FIG. 11.

Referring to FIG. 13, a method will be described where using sub-channel selecting section 1008 selects a sub-channel in retransmission of the access request signal. In FIG. 13, in step (hereinafter, referred to as "ST") 1201, it is determined whether or not the maximum Doppler frequency (fD) exceeds a threshold (80 Hz), and the processing shifts to ST1203 when the maximum Doppler frequency is determined to exceed the threshold (Yes), and the processing shifts to ST1202 when the maximum Doppler frequency is determined not to exceed the threshold (No).

In ST1202, it is determined whether or not the delay spread exceeds a threshold (100 ns), and the processing shifts to ST1203 when the delay spread is determined to exceed the threshold (Yes), and the processing shifts to ST1204 when the delay spread is determined not to exceed the threshold (No).

In ST1203, a sub-channel is randomly selected from sub-channels within a range less than the predetermined number P of sub-channels from the sub-channel used in the previous transmission. In ST1204, a sub-channel is randomly selected from sub-channels spaced apart from the sub-channel used in the previous transmission by the predetermined number of sub-channels P or more.

Referring again to FIG. 12, communication terminal apparatus 1000-1 has small frequency selectivity (delay spread—30 ns) and a low moving speed (fD=5 Hz), and meets the conditions that the delay spread is less than or equal to the threshold (100 ns) and that the maximum Doppler frequency is less than or equal to the threshold (80 Hz). Therefore, in retransmission, based on the method of selecting a sub-channel as shown in FIG. 13, communication terminal apparatus 1000-1 selects a sub-channel randomly from sub-channels spaced apart from sub-channel #10 used in the previous transmission by frequencies of five sub-channels or more, and as a result, selects sub-channel #3 to transmit. Meanwhile, communication terminal apparatus 1000-2 has large frequency selectivity (delay spread=200 ns) and a high moving speed (fD)=150 Hz), and does not meet the conditions that the delay spread is less than or equal to 100 ns and that the maximum Doppler frequency is less than or equal to 80 Hz. Therefore, communication terminal apparatus 1000-2 selects a sub-channel randomly from sub-channels within a range less than five sub-channels from sub-channel #10 used in the previous transmission, and as a result, selects sub-channel #8 to transmit.

Described next is the reason why a sub-channel in frequency spaced further apart from the sub-channel used in the previous transmission is selected as the delay spread is smaller and the maximum Doppler frequency is lower. As the cause of RACH transmission failure, a drop in reception power on the frequency axis caused by frequency selective fading and collision (where communication terminals of two or more users transmit signals concurrently on the same sub-channel) can be considered.

Upon retransmission on the RACH, it is possible to decrease the probability of transmission failure due to the above-mentioned two causes, and to reduce the transmission delay. For the drop in reception power due to frequency selective fading, by performing transmission using a sub-channel of a propagation path different from the propagation path of the sub-channel previously used when transmission fails, it is possible to decrease the probability that the reception power drops due to frequency selective fading also upon retransmission. Therefore, it is only necessary to use a sub-channel spaced sufficiently apart from the previously used sub-channel on the frequency axis.

However, when selection is limited to the sufficiently spaced sub-channels on the frequency axis, the probability increases that collision occurs upon retransmission. Hence, in order to decrease the probability of collision upon retransmission, based on the delay spread and maximum Doppler frequency, a distance is determined by which a sub-channel is spaced apart from the previously used sub-channel on the frequency axis. More specifically, in a user with a low maximum Doppler frequency and small delay spread, a variation amount of the propagation path is small between retransmission and previous transmission and fluctuation in the propagation path in the frequency direction is moderate, and therefore a sub-channel spaced apart from the previously used sub-channel by a predetermined number of sub-channels or more on the frequency axis is selected. In users other than the above-mentioned user, the propagation path varies with time or substantially fluctuates in the frequency direction, and therefore a possibility is high that the propagation path is different even when the sub-channel is not spaced by a large amount on the frequency axis. Accordingly, a sub-channel is selected from a predetermined range from the previously used sub-channel. Generally, in a cellular system, users with various propagation path conditions exist in the cell, so that, by selecting a different sub-channel for each user by the above-mentioned selection method, it is possible to improve the probability of avoiding collision.

Thus, according to communication terminal apparatus 1000 according to this Embodiment, a subcarrier used upon retransmission on the RACH is spaced apart from the previously used subcarrier on the frequency axis according to a fluctuation amount of the propagation path from previous transmission, so that it is possible to decrease the probability of transmission failure on the RACH due to collision and drop of fading. As a result, it is not necessary to provide a long back-off time, and the number of retransmissions on the RACH can be decreased, so that it is possible to start communication in a short time, and improve the communication quality in packet communication having exacting delay requirement, such as speech communication and video transmission. Further, by decreasing the number of retransmissions, it is possible to suppress reduction in throughput.

In addition, this Embodiment describes the case of using both the frequency selectivity and speed of time fluctuation as propagation path conditions, but only one of the both may be used. Further, the frequency selectively may be defined by coherent bandwidth (bandwidth where the propagation path can be regarded as being constant) or the like, and the speed of time fluctuation may be defined by coherent time (time where the propagation path can be regarded as being constant) or the like.

Further, a plurality of thresholds may be set on each of delay spread and maximum Doppler frequency, and a selection width of a plurality of sub-channels corresponding to the thresholds may be set.

Furthermore, the case has been described where response determining section 107 counts the number of retransmissions of the access request signal, but response determining section 107 may determine only whether or not to retransmit the access request signal.

Embodiment 6

Embodiment 6 of the present invention describes the case where a plurality of sub-channels explained in Embodiment 5 is grouped.

Figure 14:
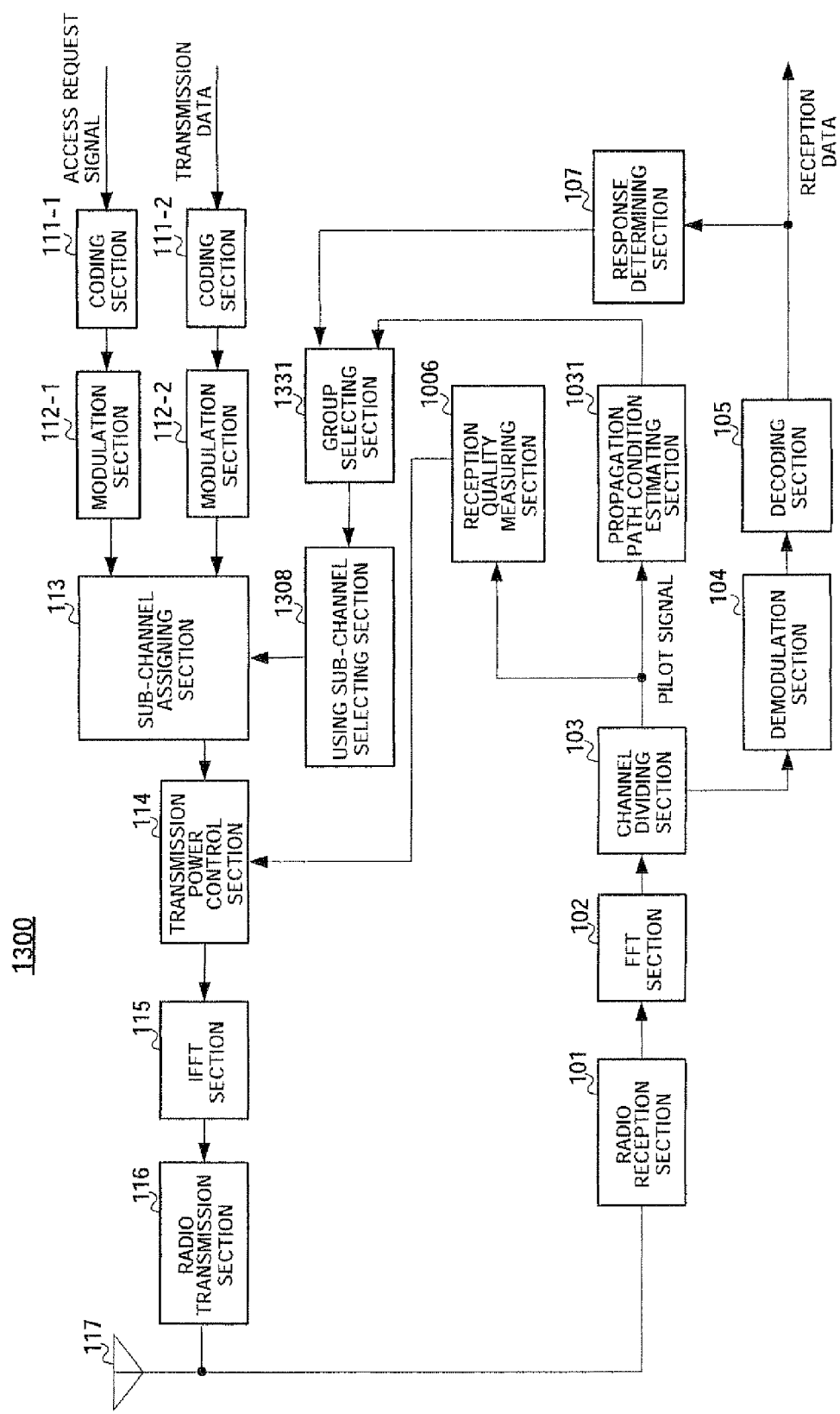
FIG. 14 is a block diagram illustrating a configuration of a communication terminal apparatus according to Embodiment 6 of the present invention.

FIG. 14 is a block diagram illustrating a configuration of communication terminal apparatus 1300 according to Embodiment 6 of the present invention. Communication terminal apparatus 1300 has using sub-channel selecting section 1308 instead of using sub-channel selecting section 1008 and further has group selecting section 1331 in communication terminal apparatus 1000 according to Embodiment 5.

Group selecting section 1331 selects a single group from groups each configured with a plurality of sub-channels. More specifically, when the number of retransmissions reported from response determining section 107 is zero, group selecting section 1308 randomly selects a group to be used. When the number of retransmissions reported from response determining section 107 is one or more, group selecting section 1331 randomly selects a group based on the maximum Doppler frequency and delay spread reported from propagation path condition estimating section 1031. For example, when the maximum Doppler frequency is more than or equal to a predetermined threshold (for example, 80 Hz), group selecting section 1331 selects the same group as the group used in the previous transmission. When the maximum Doppler frequency is less than the threshold, group selecting section 1308 selects a group different from the previously used group. Further, in the case where the maximum Doppler frequency is less than the predetermined threshold, group selecting section 1331 selects a group within a range less than a predetermined number of groups (for example, two groups) from the group used in the previous transmission when the e delay spread is more than or equal to a predetermined threshold (100 ns), and selects a group spaced apart from the group used in the previous transmission by the predetermined number of groups or more when the delay spread is less than the predetermined threshold. The selected group is reported to using sub-channel selecting section 1308.

Using sub-channel selecting section 1308 selects a single sub-channel randomly from sub-channels of the group reported from group selecting section 1331, and reports the selected sub-channel to sub-channel assigning section 113.

The operation of communication terminal apparatus 1300 will be described below with reference to FIG. 15.

Figure 15:
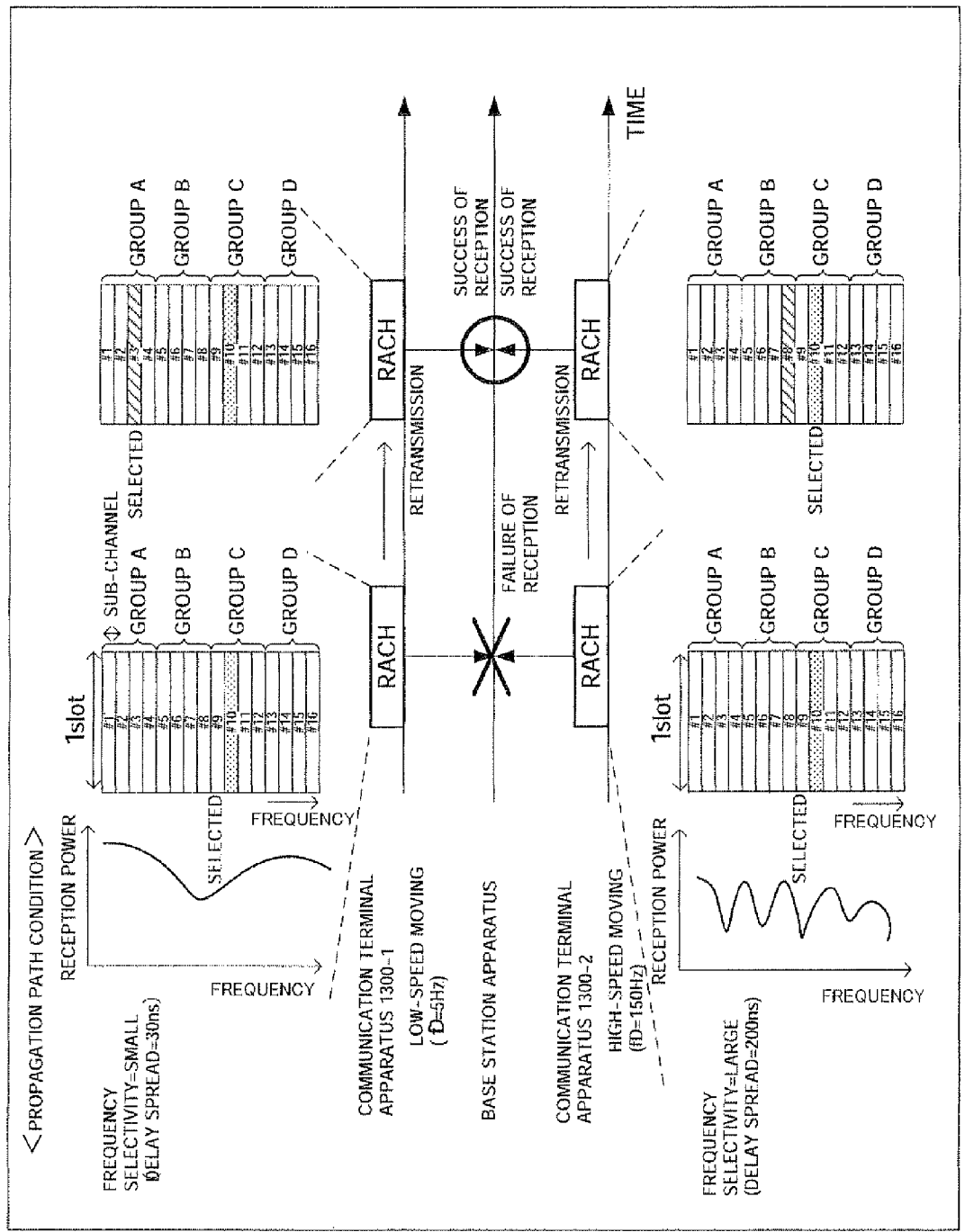
FIG. 15 schematically shows the operation of the communication terminal apparatus upon start of communication according to Embodiment 6 of the present invention.

In FIG. 15, it is assumed that sixteen sub-channels are divided into four groups each configured with four sub-channels, and that communication terminal apparatuses 1300-1 and 1300-2 first transmit access request signals to the same base station on the same conditions as in FIG. 12. In other words, neither of communication terminal apparatuses 1300-1 and 1300-2 can receive an access permission signal within a predetermined waiting period on the first access request signals, and the access request signals are retransmitted.

Figure 16:
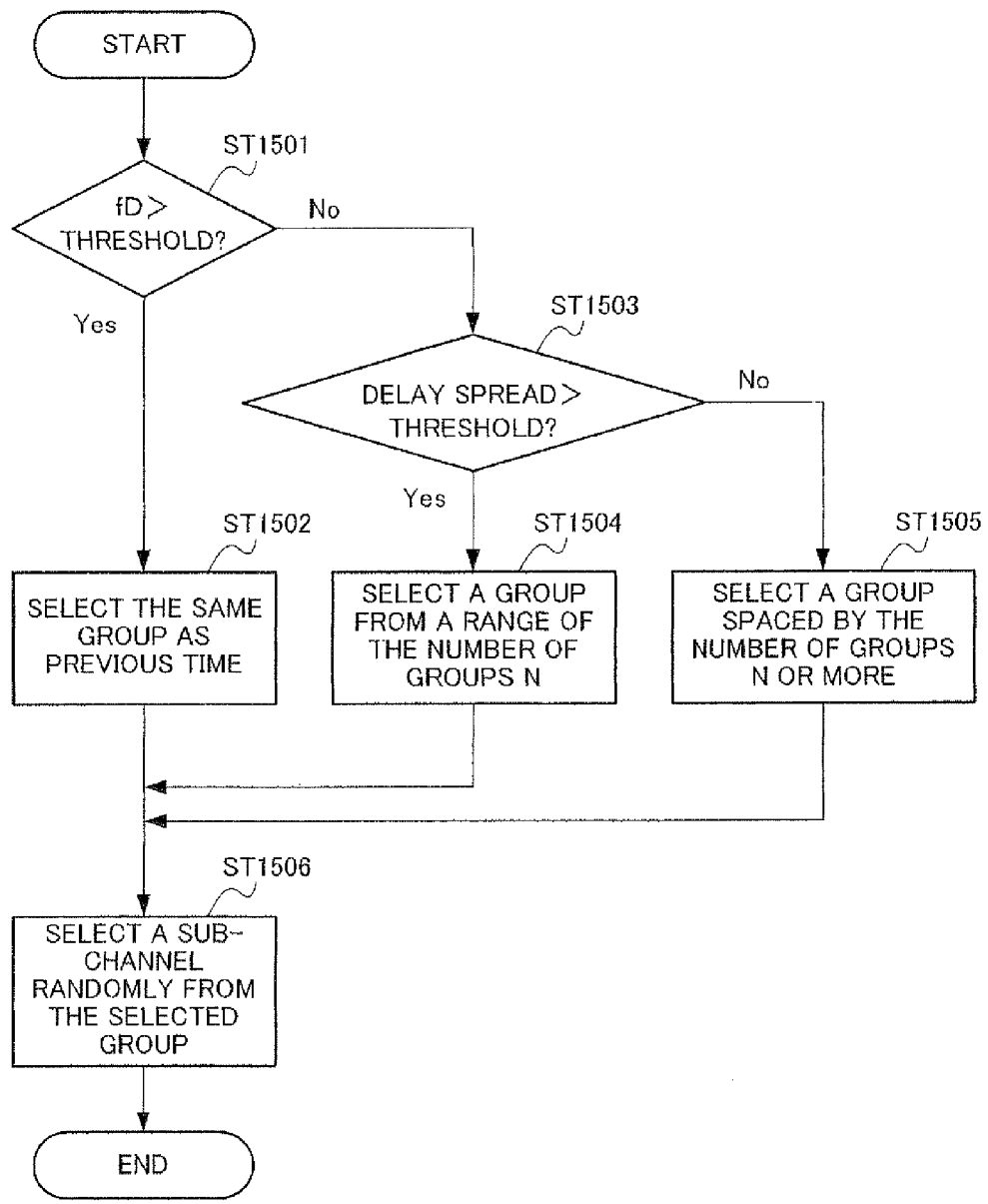
FIG. 16 is a flowchart illustrating the method of selecting a sub-channel.

In retransmission of the access request signals, a method of selecting a sub-channel will be described below with reference to FIG. 16. In FIG. 16, in ST1501, group selecting section 1331 determines whether or not the maximum Doppler frequency (fD) exceeds the threshold (80 Hz), and the processing shifts to ST1502 when the maximum Doppler frequency is determined to exceed the threshold (Yes), and the processing shifts to ST1503 when the maximum Doppler frequency is determined not to exceed the threshold (No).

In ST1502, group selecting section 1331 selects a group different from another group used in the previous transmission, and the processing shifts to ST1506.

In ST1503, group selecting section 1331 determines whether or not the delay spread exceeds the threshold (100 ns), and the processing shifts to ST1504 when the delay spread is determined to exceed the threshold (Yes), and the processing shifts to ST1505 when the delay spread is determined not to exceed the threshold (No).

In ST1504, group selecting section 1331 selects a group randomly from groups within a range less than the predetermined number of groups N from the group used in the previous transmission. In ST1505, group selecting section 1331 selects a group randomly from groups spaced apart from the group used in the previous transmission by the predetermined number of groups N or more.

In ST1506, using sub-channel selecting section 1308 selects a sub-channel randomly from the selected group.

Referring to FIG. 15 again, upon retransmission, communication terminal apparatus 1300-1 has the maximum Doppler frequency of 5 Hz that is less than the predetermined threshold (for example, 80 Hz), and therefore, based on the sub-channel selecting method as shown in FIG. 16, selects a group different from the group (group C) used in the previous transmission. Further, since the delay spread is 30 ns and less than the predetermined threshold (for example, 100 ns), communication terminal apparatus 1300-1 selects group A spaced apart from group C by two groups or more. Then, as the result of selecting a sub-channel randomly from group A, communication terminal apparatus 1300-1 performs transmission using sub-channel #3.

Meanwhile, communication terminal apparatus 1300-2 has the maximum Doppler frequency of 150 Hz that is more than the predetermined threshold (for example, 80 Hz), and therefore, selects group C as the same group as the group used in the previous transmission. Then, as the result of selecting a sub-channel randomly from group C, communication terminal apparatus 1300-2 performs transmission using sub-channel #12.

Thus, according to communication terminal apparatus 1300 according to this Embodiment, upon retransmission on the RACH, a sub-channel is selected from the same group as in the previous transmission when a fluctuation amount in the time direction of the propagation path is large and the maximum Doppler frequency is high in each communication terminal apparatus, and a sub-channel is selected from a group different from that in the previous transmission when a fluctuation amount in the time direction of the propagation path is small and the maximum Doppler frequency is low, so that it is possible to reduce the probability of RACH transmission failure due to a drop in fading and collision. Further, upon selection of a group different from that in the previous transmission, by selecting a group in frequency spaced apart from the group used in the previous transmission according to the fluctuation amount in the frequency direction of the propagation path—delay spread—, it is possible to further reduce the probability of RACH transmission failure due to a drop in fading. As a result, it is not necessary to provide a long back-off time, and the number of retransmissions on the RACH can be decreased, so that it is possible to start communication in a short time and improve the communication quality in packet communication having exacting delay requirement, such as speech communication and video transmission. Further, by decreasing the number of retransmissions, it is possible to suppress reduction in throughput.

In addition, in this Embodiment, the case has been described where both the frequency selectivity and speed of the time fluctuation are used as propagation path conditions, but only one of the both may be used. Further, the frequency selectively may be defined by coherent bandwidth (bandwidth where the propagation path can be regarded as being constant) or the like, and the speed of time fluctuation may be defined by coherent time (time where the propagation path can be regarded as being constant) or the like.

Further, the case has been described as an example where sub-channels in a group are OFDM subcarriers, but the present invention is not limited thereto. For example, the sub-channels may be spreading codes or patterns of symbol repetition, for example.

Each of Embodiments of the present invention has been described in the foregoing.

In addition, in each of the above-mentioned Embodiments, the case has been described where the communication terminal apparatus handles as one unit a carrier group configured with a plurality of subcarriers of an OFDM signal, measures the reception quality of a pilot signal on a basis of the carrier group—on a sub-channel basis—, and transmits an access request signal to the base station apparatus, but the present invention is not limited to this case. For example, the communication terminal apparatus may measure the reception quality of a pilot signal on a subcarrier basis in an OFDM signal, and transmit an access request signal to the base station apparatus using one of subcarriers.

The present invention can be applied to other signals other than the access request signals, if the signals are data transmitted using the RACH. Further, the RACH may be expressed by a contention channel, competition channel, or the like.

Further, in each of the above-mentioned Embodiments, the case has been described as an example where OFDM is used as a transmission scheme, but the present invention is not limited to the case. For example, the present invention can be applied to a transmission scheme such as FDMA (Frequency Division Multiple Access) for transmitting a single-carrier signal using a plurality of carriers or frequencies, and the same effects can be obtained. In this case, the sub-channel indicates one single-carrier signal, for example.

Furthermore, the present invention can be applied to a transmission scheme such as IFDMA (Interleaved FDMA) using a frequency arrangement with dispersion in comb-shape, that is, equal intervals. In this case, the sub-channel is one IFDMA signal. The IFDMA signal may be referred to as distributed channel.

Still furthermore, the channel may be divided further by spreading code and the like in one single-carrier signal or IFDMA signal. In this case, the sub-channel indicates a spreading code in one single-carrier signal.

Moreover, different transmission schemes may be used between uplink and downlink.

Further, in each of the above-mentioned Embodiments, the present invention can be similarly applied to a case of transmitting a preamble prior to transmission on the RACH.

Furthermore, in each of the above-mentioned Embodiments, one of the TDD scheme and FDD scheme has been assumed and described, but the present invention can be applied to both of the schemes.

Furthermore, although a case has been described as an example in which the present invention is implemented with hardware, the present invention can be implemented with software.

Still further, each function block used to explain the above-described embodiments is typically implemented as an LSI constituted by an integrated circuit. These may be individual chips or may partially or totally contained on a single chip. Here, each function block is described as an LSI, but this may also be referred to as "IC", "system LSI", "super LSI", "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor in which connections and settings of circuit cells within an LSI can be reconfigured is also possible.

Further, if integrated circuit technology comes out to replace LSI's as a result of the development of semiconductor technology or a derivative other technology, it is naturally also possible to carry out function block integration using this technology. Application in biotechnology is also possible.

A first aspect of the present invention is a communication terminal apparatus provided with: a sub-channel selector that selects a sub-channel to be used in transmission of a random access signal from a group of sub-channels defined by a class of frequency, and selects the sub-channel different from previously used sub-channel whenever retransmitting the random access signal; and a transmitter that transmits the random access signal using the selected sub-channel.

A second aspect of the present invention is a communication terminal apparatus further having: a receiver that receives a pilot signal; and a measurer that measures reception quality of the received pilot signal for each sub-channel defined by a class of frequency in the above-mentioned aspect, wherein the sub-channel selector selects a sub-channel from a group of sub-channels using the measured reception quality.

A third aspect of the present invention is a communication terminal apparatus in the above-mentioned aspect wherein the sub-channel selector randomly selects one from a group of sub-channels with the reception quality measured in the measurer being more than or equal to a predetermined threshold.

A fourth aspect of the present invention is a communication terminal apparatus in the above-mentioned aspect wherein the sub-channel selector selects a sub-channel with the reception quality measured in the measurer being the highest.

A fifth aspect of the present invention is a communication terminal apparatus in the above-mentioned aspect wherein the sub-channel selector randomly selects one from M sub-channels with the reception quality measured in the measurer being higher.

A sixth aspect of the present invention is a communication terminal apparatus further having a response determiner that determines the presence or absence of a response of the transmitted access request signal, and thereby counts the number of retransmissions of the random access signal in the above-mentioned aspect, wherein the sub-channel selector decreases the threshold used upon selecting of the sub-channel in accordance with an increase in the number of retransmissions counted in the response determiner.

A seventh aspect of the present invention is a communication terminal apparatus further having a response determiner that determines the presence or absence of a response of the transmitted random access signal, and thereby counts the number of retransmissions of the access request signal in the above-mentioned aspect, wherein the sub-channel selector selects a sub-channel with the reception quality measured in the measurer being the highest when the number of retransmissions counted in the response determiner is zero, and selects a sub-channel with the lower reception quality measured in the measurer corresponding to the counted number of retransmissions from the highest reception quality when the number of retransmissions counted in the response determiner is one or more.

An eighth aspect of the present invention is a communication terminal apparatus further having a response determiner that determines the presence or absence of a response of the transmitted random access signal, and thereby counts the number of retransmissions of the access request signal in the above-mentioned aspect, wherein the sub-channel selector selects a sub-channel with the reception quality measured in the measurer being the highest when the number of retransmissions counted in the response determiner is zero, and randomly selects one from M sub-channels with the reception quality measured in the measurer being higher when the number of retransmissions counted in the response determiner is one or more.

A ninth aspect of the present invention is a communication terminal apparatus in the above-mentioned aspect wherein the sub-channel selector increases the number M of sub-channels with higher reception quality in accordance with an increase in the counted number of retransmissions when the number of retransmissions counted in the response determiner is one or more.

A tenth aspect of the present invention is a communication terminal apparatus further having a priority determiner that determines a priority of transmission data to be transmitted after communication starts by transmission of the random access signal in the above-mentioned aspect, wherein the sub-channel selector increases the number M of sub-channels with higher reception quality according to the priority of the transmission data determined in the priority determiner.

An eleventh aspect of the present invention is a communication terminal apparatus further having a response determiner that determines the presence or absence of a response of the transmitted random access signal, and thereby counts the number of retransmissions of the access request signal in the above-mentioned aspect, wherein the sub-channel selector increases the number M of sub-channels with higher reception quality in accordance with an increase in the counted number of retransmissions when the number of retransmissions counted in the response determiner is one or more.

A twelfth aspect of the present invention is a communication terminal apparatus further having in the above-mentioned aspect: a response determiner that determines the presence or absence of a response of the transmitted random access signal, and thereby determines whether or not to retransmit the random access signal; and an estimator that estimates a propagation path condition, wherein the sub-channel selector selects a sub-channel to be used in transmission of the random access signal based on the propagation path condition estimated in the estimator, when the response determiner determines to retransmit the random access signal.

A thirteenth aspect of the present invention is a communication terminal apparatus in the above-mentioned aspect wherein the estimator estimates the propagation path condition as speed of fluctuation in the time direction of the propagation path.

A fourteenth aspect of the present invention is a communication terminal apparatus in the above-mentioned aspect wherein the sub-channel selector selects a sub-channel with a difference in frequency from a sub-channel used in previous transmission of the random access signal being less than a predetermined amount when the speed of the fluctuation in the time direction of the propagation path is more than or equal to a predetermined threshold, and selects a sub-channel with the difference in frequency from the sub-channel used in the previous transmission of the random access signal being more than or equal to the predetermined amount when the speed is less than the predetermined threshold.

A fifteenth aspect of the present invention is a communication terminal apparatus in the above-mentioned aspect wherein the estimator estimates the propagation path condition as speed of fluctuation in the frequency direction of the propagation path.

A sixteenth aspect of the present invention is a communication terminal apparatus in the above-mentioned aspect wherein the sub-channel selector selects a sub-channel with a difference in frequency from a sub-channel used in previous transmission of the random access signal is less than a predetermined amount when the speed of the fluctuation in the frequency direction of the propagation path is more than or equal to a predetermined threshold, and selects a sub-channel with the difference in frequency from the sub-channel used in the previous transmission of the random access signal is more than or equal to the predetermined amount when the speed is less than the predetermined threshold.

A seventeenth aspect of the present invention is a communication terminal apparatus in the above-mentioned aspect wherein the estimator estimates the propagation path condition as both the speed of the fluctuation in the time direction and the speed of the fluctuation in the frequency direction of the propagation path.

An eighteenth aspect of the present invention is a communication terminal apparatus in the above-mentioned aspect wherein the sub-channel selector selects a sub-channel with a difference in frequency from a sub-channel used in previous transmission of the random access signal being more than or equal to the predetermined amount when the speed of the fluctuation in the time direction of the propagation path is less than a predetermined first threshold and the speed of the fluctuation in the frequency direction is less than a predetermined second threshold, and selects a sub-channel with the difference in frequency from the sub-channel used in the previous transmission of the random access signal being less than the predetermined amount when the speed of the fluctuation in the time direction of the propagation path is more than or equal to the predetermined first threshold or the speed of the fluctuation in the frequency direction is more than or equal to the predetermined second threshold.

A nineteenth aspect of the present invention is a communication terminal apparatus in the above-mentioned aspect wherein the sub-channel selector selects one of groups each configured with a plurality of sub-channels based on the propagation p h condition, and further selects one of sub-channels of the selected group.

A twentieth aspect of the present invention is a communication terminal apparatus in the above-mentioned aspect wherein the sub-channel selector selects the same group as a group selected in previous transmission of the random access signal when the speed of the fluctuation in the time direction of the propagation path condition is more than or equal to a predetermined threshold, and selects a group different from the group selected in the previous transmission of the random access signal when the speed is less than the predetermined threshold.

A twenty-first aspect of the present invention is a communication terminal apparatus in the above-mentioned aspect wherein the sub-channel selector selects a group with a difference in frequency from the group selected in previous transmission of the random access signal being less than a predetermined amount when the speed of the fluctuation in the time direction of the propagation path is less than a predetermined first threshold and the speed of the fluctuation in the frequency direction of the propagation path is more than or equal to a predetermined second threshold, and selects a group with the difference in frequency from the group selected in the previous transmission of the random access signal being more than or equal to the predetermined amount when the speed of the fluctuation in the frequency direction of the propagation path is less than the predetermined second threshold.

A twenty-second aspect of the present invention is a communication terminal apparatus in the above-mentioned aspect wherein the sub-channel is a subcarrier or a subcarrier block in an OFDM signal.

A twenty-third aspect of the present invention is a communication terminal apparatus in the above-mentioned aspect wherein the sub-channel is one single-carrier signal in an FDMA system.

A twenty-fourth aspect of the present invention is a radio communication method having: a sub-channel selecting step of selecting a sub-channel to be used in transmission of a random access signal from a group of sub-channels defined by a class of frequency, and selecting the sub-channel different from previously used sub-channel whenever retransmitting the random access signal; and a transmitting step of transmitting the random access signal using the selected sub-channel.

The present application is based on Japanese Patent Applications No. 2004-207196 filed on Jul. 14, 2004, and No.

2005-200276 filed on Jul. 8, 2005, entire contents of which are expressly incorporated by reference herein.

INDUSTRIAL APPLICABILITY

The communication terminal apparatus and radio communication method according to the present invention provide an advantage of decreasing the probability of occurrence of collision of access request signals and reducing the number of retransmissions of the access request signal, and are useful as a mobile radio communication terminal apparatus and the like such as a mobile telephone and PDA.

The invention claimed is:

1. A base station comprising:
   a receiving unit configured to receive a random access signal;
   a transmitting unit configured to transmit a random access response after the receiving unit receives the random access signal within a response time period;
   wherein the receiving unit receives a retransmitted random access signal after elapse of the response time period without being set a back-off time, in the case where the random access signal cannot be received by the base station.

2. A radio communication method by a base station, comprising:
   receiving a random access signal;
   transmitting a random access response after the receiving of the random access signal within a response time period;
   wherein the receiving unit receives a retransmitted random access signal without being set a back-off time after elapse of the response time period, in the case where the random access signal cannot be received by the base station.

3. A base station comprising:
   a receiving unit configured to receive a random access signal;
   a transmitting unit configured to transmit a random access response after the receiving unit receives the random access signal within a response time period;
   wherein the receiving unit receives a retransmitted random access signal after elapse of the response time period without being set a back-off time, in the case where the base station cannot transmit the random access response.

4. A radio communication method by a base station, comprising:
   receiving a random access signal;
   transmitting a random access response after the receiving of the random access signal within a response time period;
   wherein the receiving unit receives a retransmitted random access signal without being set a back-off time after elapse of the response time period, in the case where the base station cannot transmit the random access response.

* * * * *